(12) United States Patent
Lucy et al.

(10) Patent No.: US 8,167,533 B2
(45) Date of Patent: May 1, 2012

(54) WIND ENERGY SYSTEM

(75) Inventors: Dan Lucy, Bozeman, MT (US); Michael Blevins, Bozeman, MT (US); Colin Green, Victoria (CA); Nick Blitterswyk, New York, NY (US)

(73) Assignee: The Green Electric Company, Bozeman, MO (US)

( * ) Notice: Subject to any disclaimer, the term of this patent is extended or adjusted under 35 U.S.C. 154(b) by 110 days.

(21) Appl. No.: 12/771,898

(22) Filed: Apr. 30, 2010

(65) Prior Publication Data
US 2011/0103942 A1 May 5, 2011

Related U.S. Application Data

(60) Provisional application No. 61/256,174, filed on Oct. 29, 2009, provisional application No. 61/256,474, filed on Oct. 30, 2009.

(51) Int. Cl.
*F03D 7/06* (2006.01)
*F03B 3/12* (2006.01)

(52) U.S. Cl. ..................... 415/4.2; 416/197 R
(58) Field of Classification Search .......... 415/4.2, 415/4.4, 60; 416/197 R, 198 R, DIG. 9; 290/55
See application file for complete search history.

(56) References Cited

U.S. PATENT DOCUMENTS

| | | | | |
|---|---|---|---|---|
| 1,697,574 A * | 1/1929 | Savonius | ...................... | 416/110 |
| 1,835,018 A * | 12/1931 | Darrieus | ...................... | 415/224 |
| 2,335,817 A * | 11/1943 | Topalov | ...................... | 415/4.4 |
| 4,156,580 A * | 5/1979 | Pohl | ...................... | 415/4.2 |
| 4,579,506 A | 4/1986 | Ossberger et al. | | |
| 5,083,039 A * | 1/1992 | Richardson et al. | ............ | 290/44 |
| 5,161,952 A * | 11/1992 | Eggers, Jr. | ................. | 416/223 R |
| 5,457,346 A | 10/1995 | Blumberg et al. | | |
| 5,850,108 A * | 12/1998 | Bernard | ......................... | 290/54 |
| 6,755,608 B2 | 6/2004 | Boughton | | |
| 6,942,454 B2 * | 9/2005 | Ohlmann | ........................ | 416/11 |
| 7,744,338 B2 * | 6/2010 | DeRuyter et al. | .............. | 415/2.1 |
| 2008/0085179 A1 * | 4/2008 | Kinkaid et al. | ................. | 415/4.1 |
| 2010/0187828 A1 * | 7/2010 | Reidy et al. | ..................... | 290/55 |
| 2010/0213720 A1 * | 8/2010 | Bailey et al. | ................... | 290/55 |

FOREIGN PATENT DOCUMENTS

| | | | |
|---|---|---|---|
| JP | 2001-289148 A | 10/2001 | |
| JP | 2003-193955 A | 7/2003 | |
| JP | 2005-299621 A | 10/2005 | |
| JP | 2009-085090 A | 4/2009 | |

OTHER PUBLICATIONS

Robert L. Smith, The Wind Accelerator Dome, http://windacceleratordome.com/wind_accelerator_dome_a_revoluti.htm [retrieved on Aug. 23, 2011].

* cited by examiner

*Primary Examiner* — Justine Yu
*Assistant Examiner* — Jason Davis
(74) *Attorney, Agent, or Firm* — Eric L. Lane; McKenna Long & Aldridge LLP

(57) ABSTRACT

Wind energy systems comprise a wind accelerator having a support assembly and an outer structure surrounding the support assembly. The wind accelerator has a front region and a rear region. The rear region is substantially wider than the front region, and the outer structure tapers from the rear region to the front region. One or more turbines are mounted on the support assembly at or near the rear region of the wind accelerator or at or near the widest point of the wind accelerator.

20 Claims, 19 Drawing Sheets

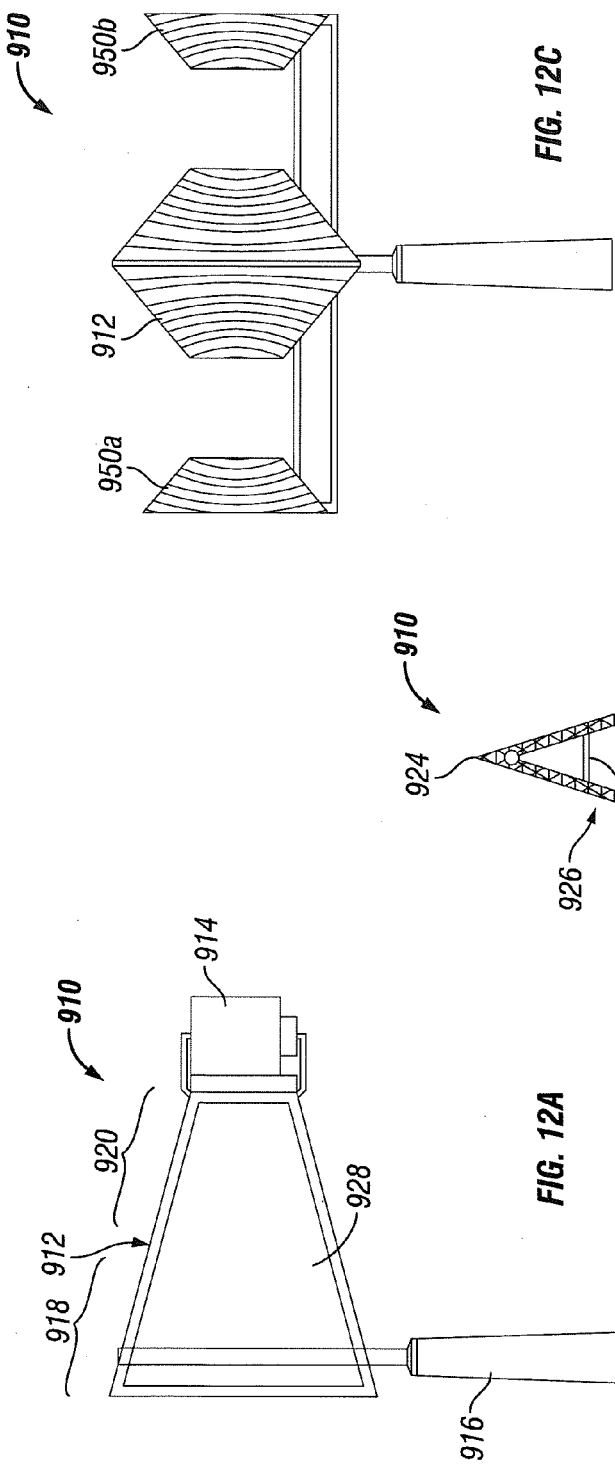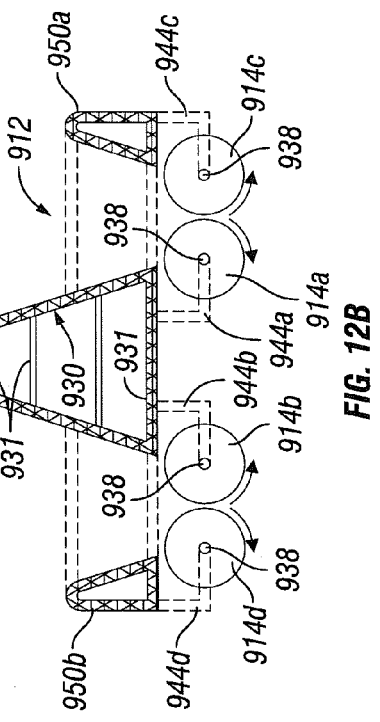

WIND ENERGY SYSTEM

CROSS-REFERENCE TO RELATED APPLICATIONS

This application claims priority to U.S. Patent Application Ser. No. 61/256,174, filed on Oct. 29, 2009, which is incorporated herein by reference in its entirety. This application also claims priority to U.S. Patent Application Ser. No. 61/256,474, filed on Oct. 30, 2009, which is incorporated herein by reference in its entirety.

FIELD

The present disclosure relates to wind energy systems and methods.

BACKGROUND

Distributed generation wind energy systems, particularly in the medium wind market in the range of 10-1,000 kilowatts (kW) of power generation, can make a substantial environmental impact and meet a growing demand for renewable energy. However, such systems are not economical because most distributed generation wind turbines operate at lower heights than utility scale models, and at these heights wind speed is below the minimum speed needed to make energy recovery economically feasible.

The type of turbine commonly used in distributed generation is a vertical axis wind turbine ("VAWT"). Current VAWTs can not translate the energy from airflow through a blade system effectively because the blade systems can not effectively spin at low altitude, under 100 feet, when the blades are required to spin high (MOI) Generator torque requiring electric generators which are 50 kW and larger.

One approach for solving this problem is to alter the design of the wind turbine or its components in an attempt to improve efficiency. Known adjustments include changing the shape of the turbine blades, incorporating an airfoil stator and even boosting efficiency by harnessing other forms of renewable energy such as the sun by adding solar cells to the wind energy system. However, such approaches increase production costs as specialized manufacturing may be required to produce different turbine designs. Adding solar cells also increases the costs of providing and installing the wind energy system.

Other wind energy systems add wind accelerator components to the turbine to increase the airspeed velocity of the air contacting the turbine blades. In one example of such a system, the accelerator is a frusto-conical funnel-like device intended to direct a stream of wind through the device onto the impeller of a windmill. This system has the disadvantage that the funnel-like device is bulky, fragile and unsightly. More significantly, it functions with horizontal access wind turbines, not the vertical axis turbines common in distributed generation applications.

Therefore, there exists a need for an economical distributed generation wind energy system that can work with existing models of vertical axis wind turbines. Specifically, there is a need for a wind energy system that does not require extra or specialized turbine components. In summary, there is a need for a distributed generation wind energy system that employs a wind accelerator to improve efficiency and can work with existing models of vertical axis wind turbines.

SUMMARY

The present disclosure, in its many embodiments, alleviates to a great extent the disadvantages of known distributed generation wind energy systems by providing a wind energy system comprising a wind accelerator having a front region and a rear region, a widest point in or near the rear region, and one or more turbines mounted on the rear region of the wind accelerator. Disclosed embodiments allow for low altitude, a 100 feet height or so wind energy generation through wind/velocity acceleration technology which in turn allows disclosed embodiments to effectively generate electricity at low heights by accelerating air from where the air enters the disclosed structure to where the air comes into contact with the VAWT Darrieus or Savonius blade system depending on the utilized structure. This also decreases the torque needed during the Moment of Inertia (MOI) and optimizes the disclosed systems' ability to turn generators at no to low wind speeds. Embodiments utilize wind and velocity acceleration technology to turn Darrieus and Savonius turbine blade systems which usually turn in an un-affected freestanding open air environment through our proprietary wind/velocity acceleration technology.

The wind accelerator may comprise a support assembly and an outer structure surrounding the support assembly. The rear region of the wind accelerator is substantially wider than the front region. The outer structure tapers from the rear region of the accelerator to the front region of the accelerator. The shape of the wind accelerator may be one of the following: a wedge, a tear drop, a tadpole, a V-shape, a W-shape, or a modified wedge, tear drop or tadpole. The turbines may be any type of wind turbine. Exemplary embodiments use vertical axis wind turbines such as Darrieus or Savonius turbines.

The design of the system is such that when air flows across the wind accelerator the air accelerates as it travels across the outer structure from the front region to the rear region. The wind accelerator directs the air into the one or more turbines such that the air contacting the one or more turbines is moving at a higher velocity than air flowing past the front region of the wind accelerator. This velocity increase is approximately 10-50%.

The system may further comprise means for orienting the system so that it faces into oncoming wind. Embodiments of a system can be controlled by a computer program which regulates the amount of power generated. This is optional. The same program allows tracking of electricity generation via an online program which keeps real time track of the energy our system generates. In exemplary embodiments, the wind accelerator may be mounted on a tower or pole to raise it to the desired height, and in exemplary embodiments, is less than about 300 feet in height. Disclosed systems will vary in size and generate between 10 kW to 5 MW of electricity from the wind.

The outer structure of the wind accelerator may be made of hard materials such as aluminum, steel, wood, or plastic. Alternatively, the outer structure may be made of a flexible material, such as Sail Cloth, which may comprise materials such as Mylar, Dacron, or Cotton or other sail material membrane. The surface of the outer structure may be suitable for direct imprinting of marketing messages or imprinting any words or designs.

Disclosed systems also utilize a reverse air flow technology which captures the eddying air coming off the back of the structure and feeds the air back through the center of the structure which turns the blade on the interior which in turn reduces the needed torque to create optimal electric generation. This also decrease the torque needed during the Moment of Inertia (MOI). In such embodiments, the support assembly may comprise a gantry framework and define a substantially hollow interior. The outer structure may define one or more rear vents and one or more front vents. Air enters the wind accelerator through the one or more rear vents and/or the one or more turbines, travels through the substantially hollow interior and exits the wind accelerator through the one or more front vents.

Embodiments of the disclosure describe a wind accelerator apparatus for the use of capturing wind via wind velocity acceleration technology. The wind accelerator apparatus comprises a front region and a rear region. The rear region of the wind accelerator apparatus is substantially wider than the front region, and the widest point of the wind accelerator apparatus is in or near the rear region. The wind accelerator apparatus may comprise a support assembly and an outer structure surrounding the support assembly. The outer structure tapers from the rear region of the apparatus to the front region of the apparatus. The shape of the wind accelerator apparatus may be one of the following: a wedge, a tear drop, a tadpole, a V-shape, a W-shape, or a modified wedge, tear drop or tadpole. The design of the wind accelerator apparatus is such that when air flows across the apparatus the air accelerates as it travels across the outer structure from the front region to the rear region. One or more turbines may be mounted on the support assembly in the rear region of the wind accelerator.

Disclosed embodiments could be used to create wind power anywhere on the planet so long as the wind speed is within the parameters of a favorable environment for electric generation. Commercial Properties, Industrial Properties, Residential Properties and Utility Companies can use the disclosed systems or buy the power the systems generate.

Disclosed embodiments of a wind energy generation system using VAWT technology and wind/velocity accelerating technology generate electricity via the wind energy through disclosed structure that captures/translates airflow directly, specifically through a proprietary structure that accelerates the air at the VAWT Blades. The blades then turn and generate electricity via the captured wind energy. Disclosed systems allow for low to high altitude energy production through varying system heights depending on the municipality which permits the system. Disclosed embodiments also utilize aluminum and sail material as the exterior structure cover which are molded into varying specialized air capture formats which create air flow velocity increases.

Accordingly, it is seen that economical distributed generation wind energy systems are provided in which a wind accelerator improves efficiency through a specialized tapered design and mounts wind turbines thereto to generate energy from wind. These and other features of the present invention will be appreciated from review of the following detailed description of the invention, along with the accompanying figures in which like reference numbers refer to like parts throughout.

BRIEF DESCRIPTION OF THE DRAWINGS

The foregoing and other objects of the invention will be apparent upon consideration of the following detailed description, taken in conjunction with the accompanying drawings, in which:

FIG. 2E is a plan view of the wind energy system of FIG. 1;

FIG. 2F is a side elevation view of the wind energy system of FIG. 1;

FIG. 12 is a plan view of an embodiment of a wind energy system in accordance with the present invention;

FIG. 13C is a plan view of an embodiment of a wind energy system in accordance with the present invention;

DETAILED DESCRIPTION

In the following paragraphs, embodiments of the present invention will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations on the present invention. As used herein, the "present invention" refers to any one of the embodiments of the invention described herein, and any equivalents. Furthermore, reference to various aspects of the invention throughout this document does not mean that all claimed embodiments or methods must include the referenced aspects. Reference to temperature, pressure, density and other parameters should be considered as representative and illustrative of the capabilities of embodiments of the invention, and embodiments can operate with a wide variety of such parameters. It should be noted that the figures do not show every piece of equipment, nor the pressures, temperatures and flow rates of the various streams.

Figure 1:
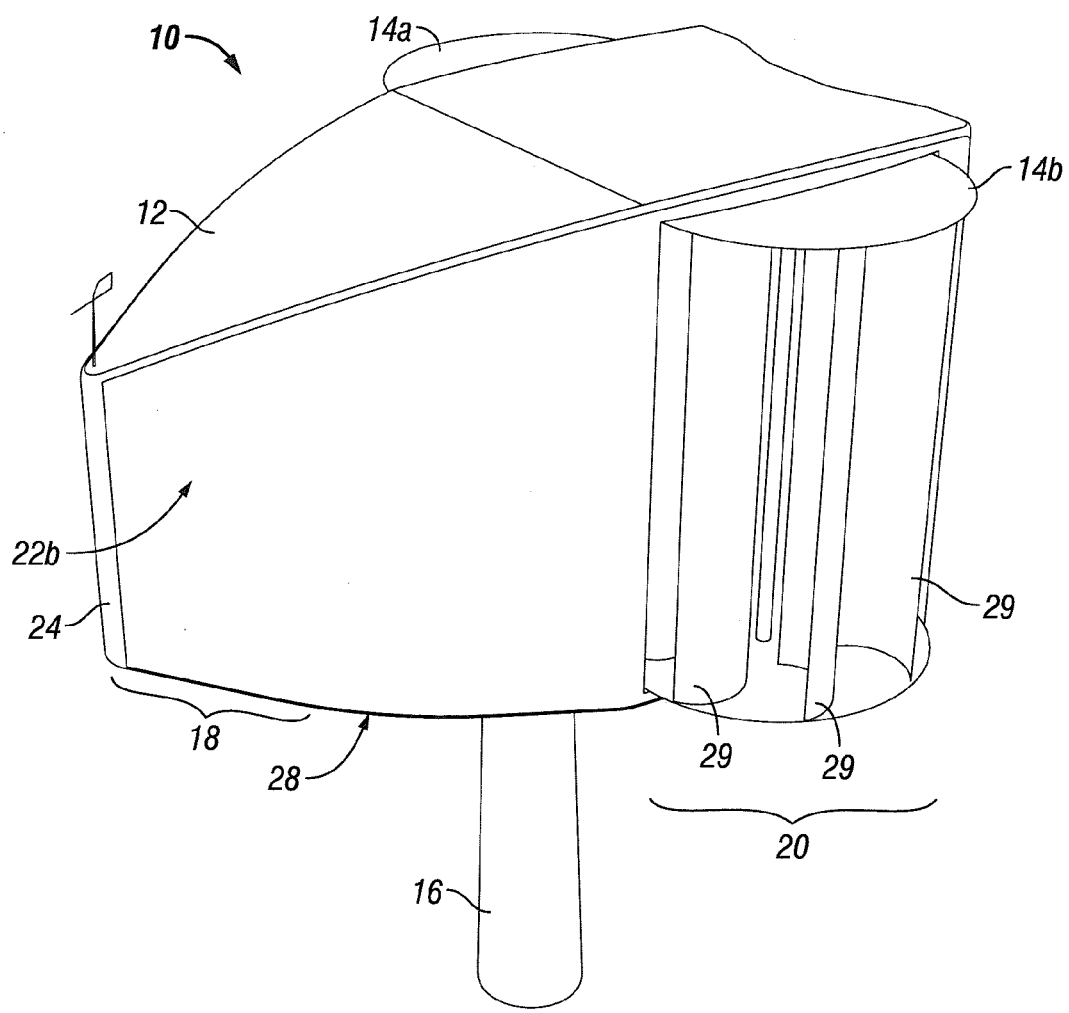
FIG. 1 is a perspective view of an embodiment of a wind energy system in accordance with the present invention.
Figure 2A:
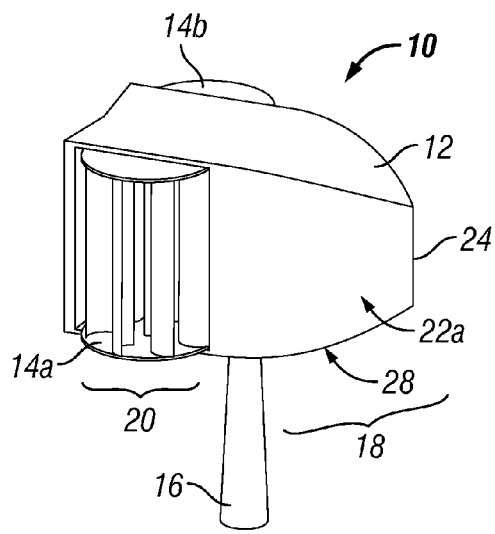
FIG. 2A is a side perspective view of the wind energy system of FIG. 1.
Figure 2B:
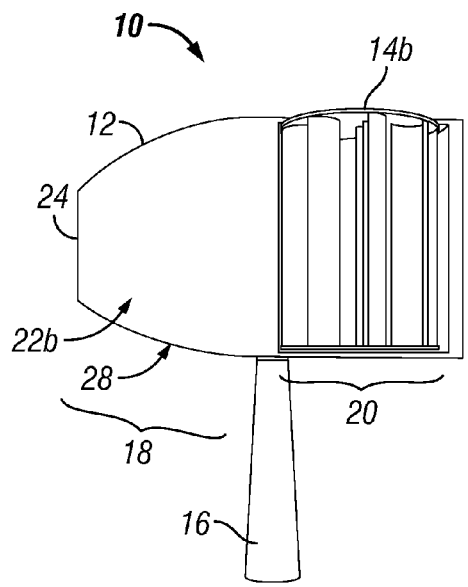
FIG. 2B is a side view of the wind energy system of FIG. 1.
Figure 2C:
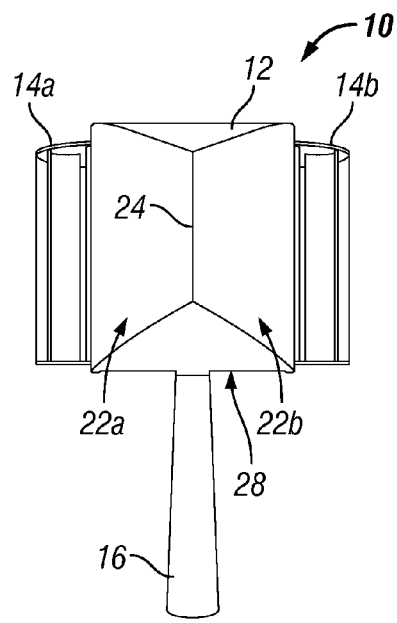
FIG. 2C is a front view of the wind energy system of FIG. 1.
Figure 2D:
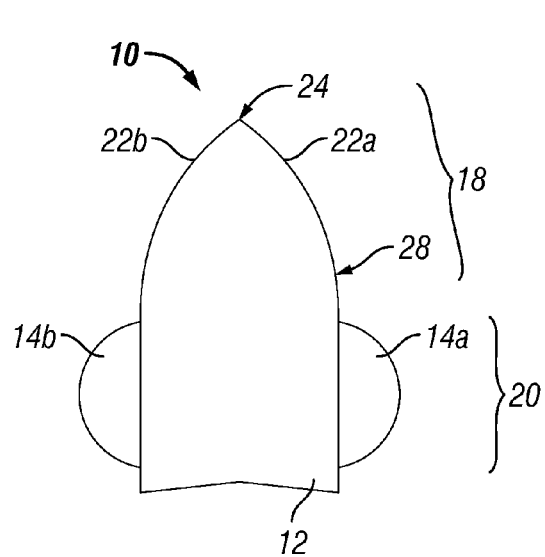
FIG. 2D is a top view of the wind energy system of FIG. 1.
Figure 3:
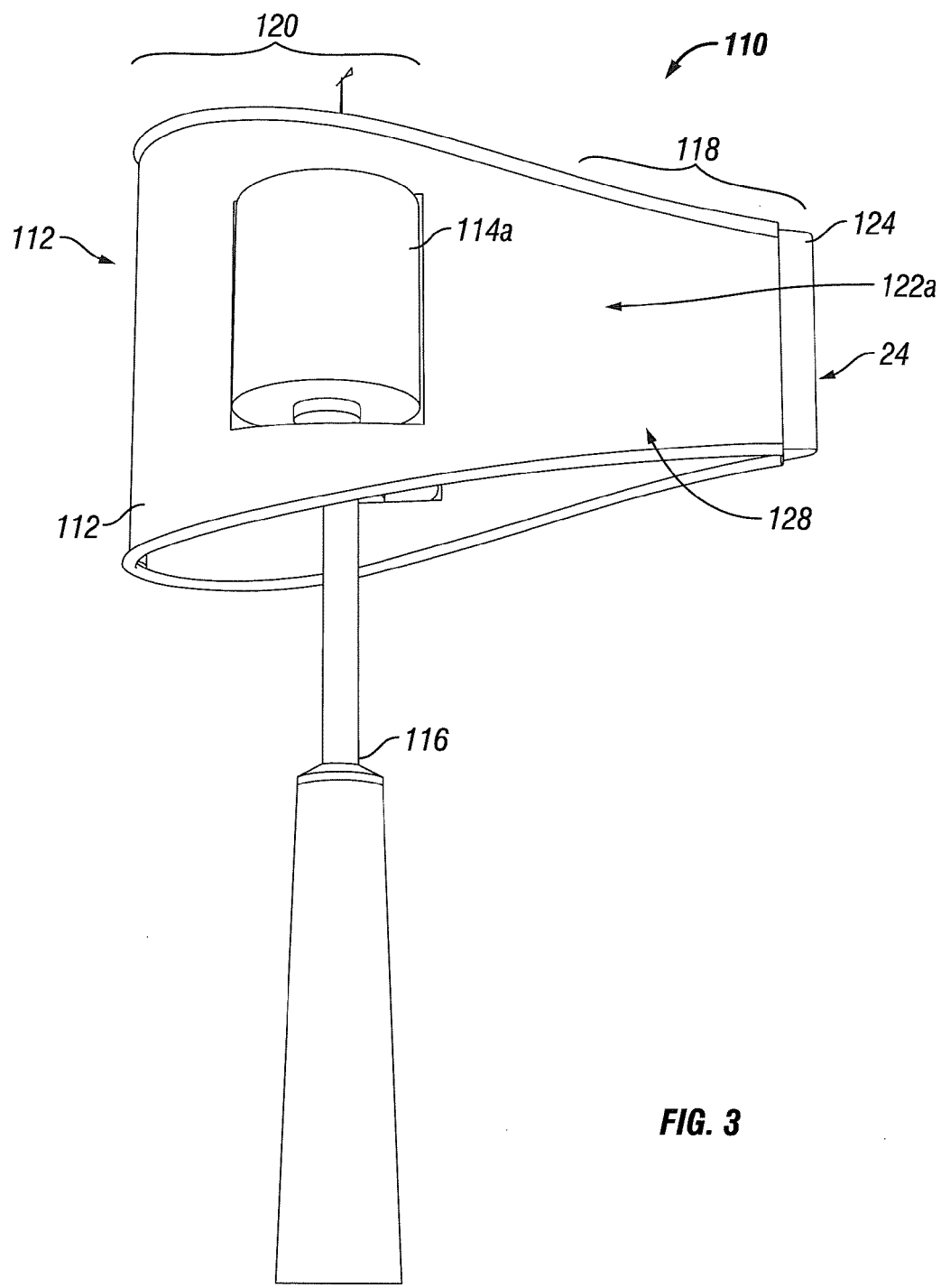
FIG. 3 is a framing plan top elevation view of an embodiment of a wind energy system in accordance with the present invention.

Referring to FIGS. 1-3, an exemplary embodiment of a wind energy system will be described. Wind energy system 10 comprises wind accelerator 12 and one or more turbines 14a, 14b mounted on the wind accelerator 12. Wind energy system 10 may include a pole 16 of any desired height and may be mounted on the pole 16 so the wind energy system 10 is situated at a desired height to receive oncoming wind. Although disclosed systems can operate at any height, exemplary embodiments are situated at heights up to about 200 feet from ground level to the top of the wind energy system 10. Disclosed embodiments advantageously provide increased efficiency at heights of about 200 feet or less.

Wind accelerator 12 is in a modified wedge shape depending on the turbine type system utilized, which is installation dependent. The wind accelerator 12 comprises a front region 18 and a rear region 20. In exemplary embodiments, rear region 20 is substantially wider than front region 18. As best seen in FIGS. 2D and 3A, the sides 22a, 22b of wind accelerator 12 taper from the rear region 20 to the front region 18 and may converge at a front point 24. The angle of the taper from the center line of the wind accelerator may vary between about 15 degrees and about 75 degrees, and in exemplary embodiments, the angle is between about 20 degrees and about 60 degrees. As discussed in more detail herein, wind accelerator 12 is situated so that front region 18 and front point 24 face into oncoming wind, thus optimizing air flow to the turbines 14 through an angle of attack that maximizes air acceleration from the front region 18 to the rear region 20. In many disclosed embodiments, the varying shapes of the wind accelerators described have in common a rear region, a front region and a taper from the rear region to the front region to advantageously accelerate air flow into the blades 29 of the wind turbines 14 mounted on the accelerators. It should be noted, however, that in certain embodiments, for example, those shown in FIGS. 13A-13C, incoming air hits the rear region and some acceleration is achieved by air flowing past a curved rear region.

Figure 7C:
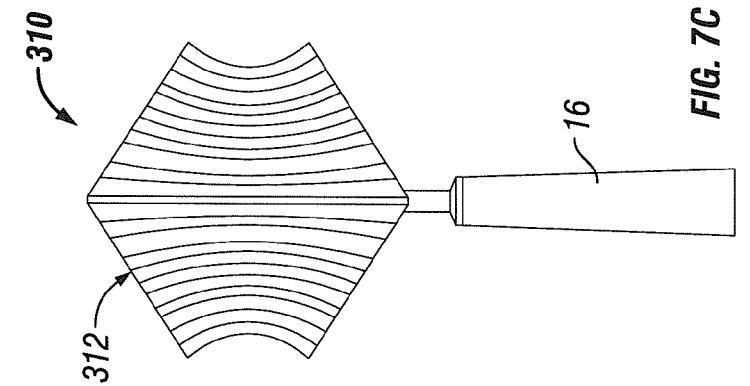
FIG. 7 is a side perspective view of an embodiment of a wind energy system in accordance with the present invention.
Figure 7B:
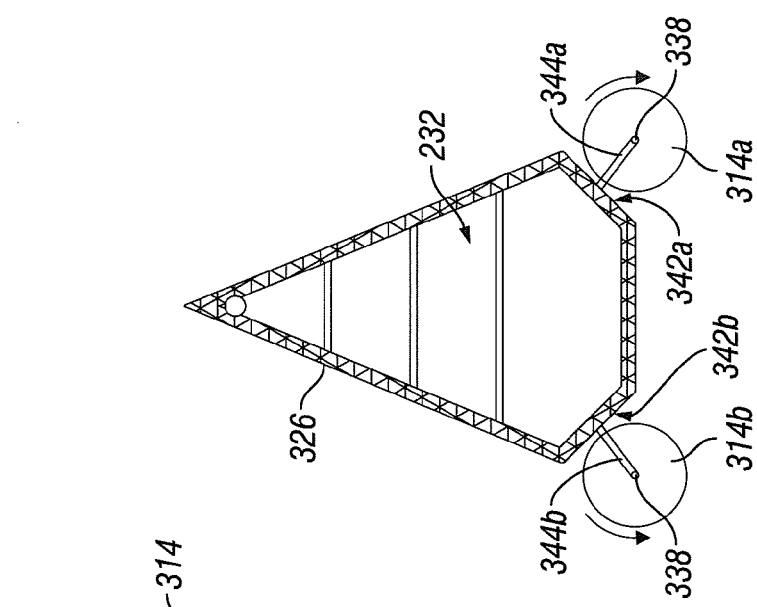
Figure 7A:
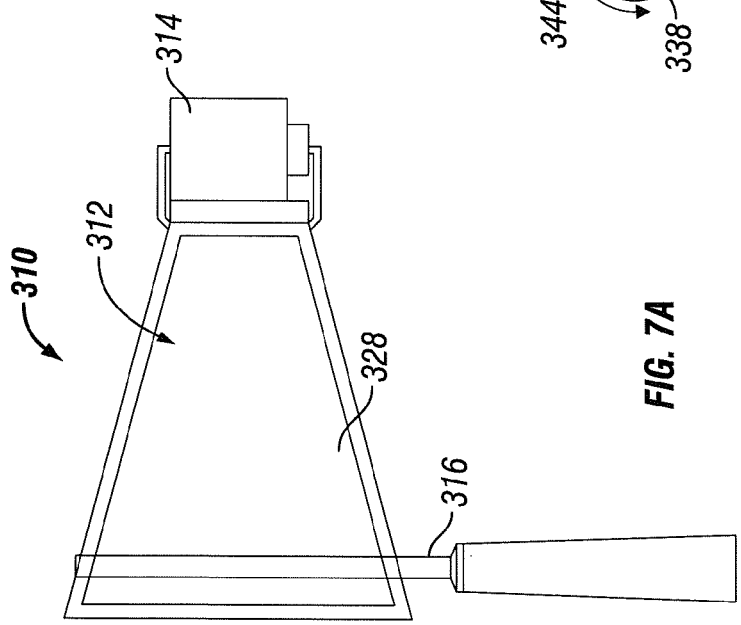
Figure 8:
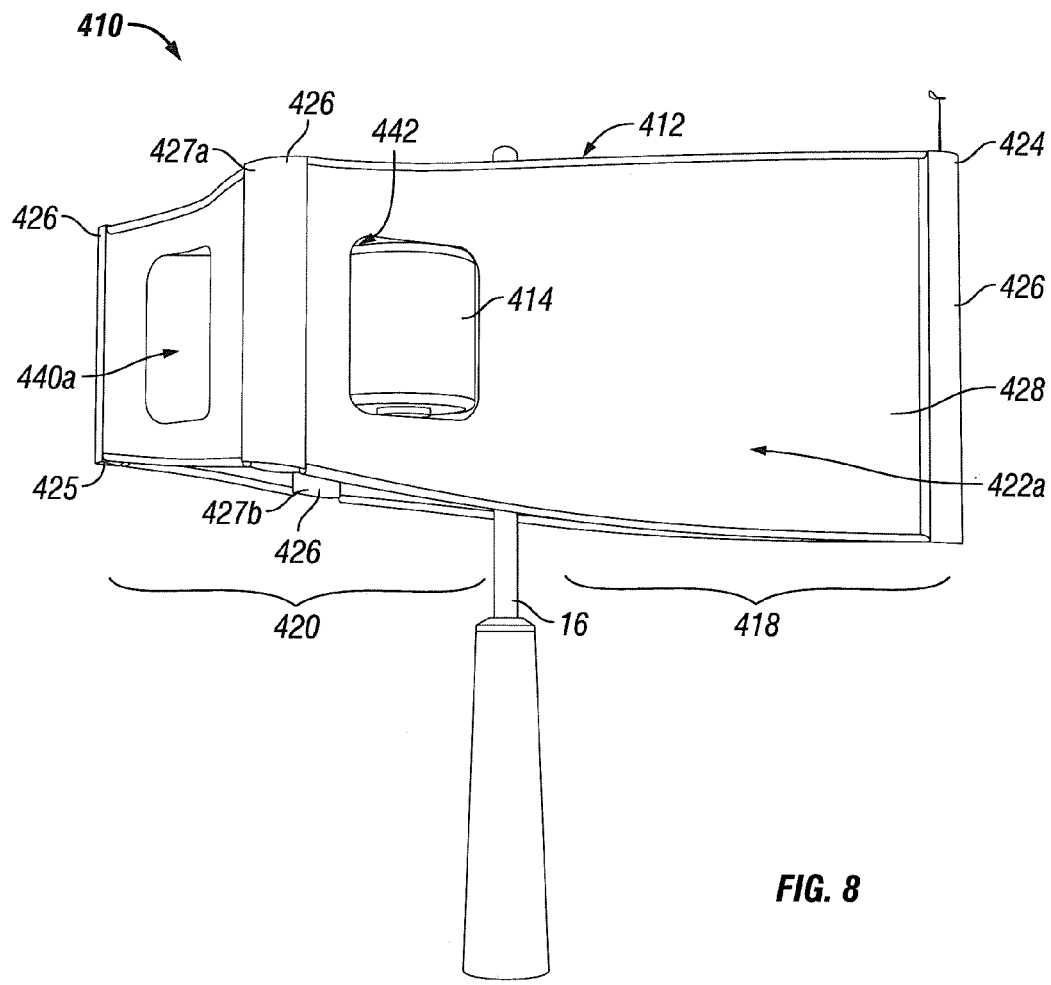
FIG. 8 is a perspective view of an embodiment of a wind energy system in accordance with the present invention with the outer structure removed to show an embodiment of a support assembly.
Figure 9:
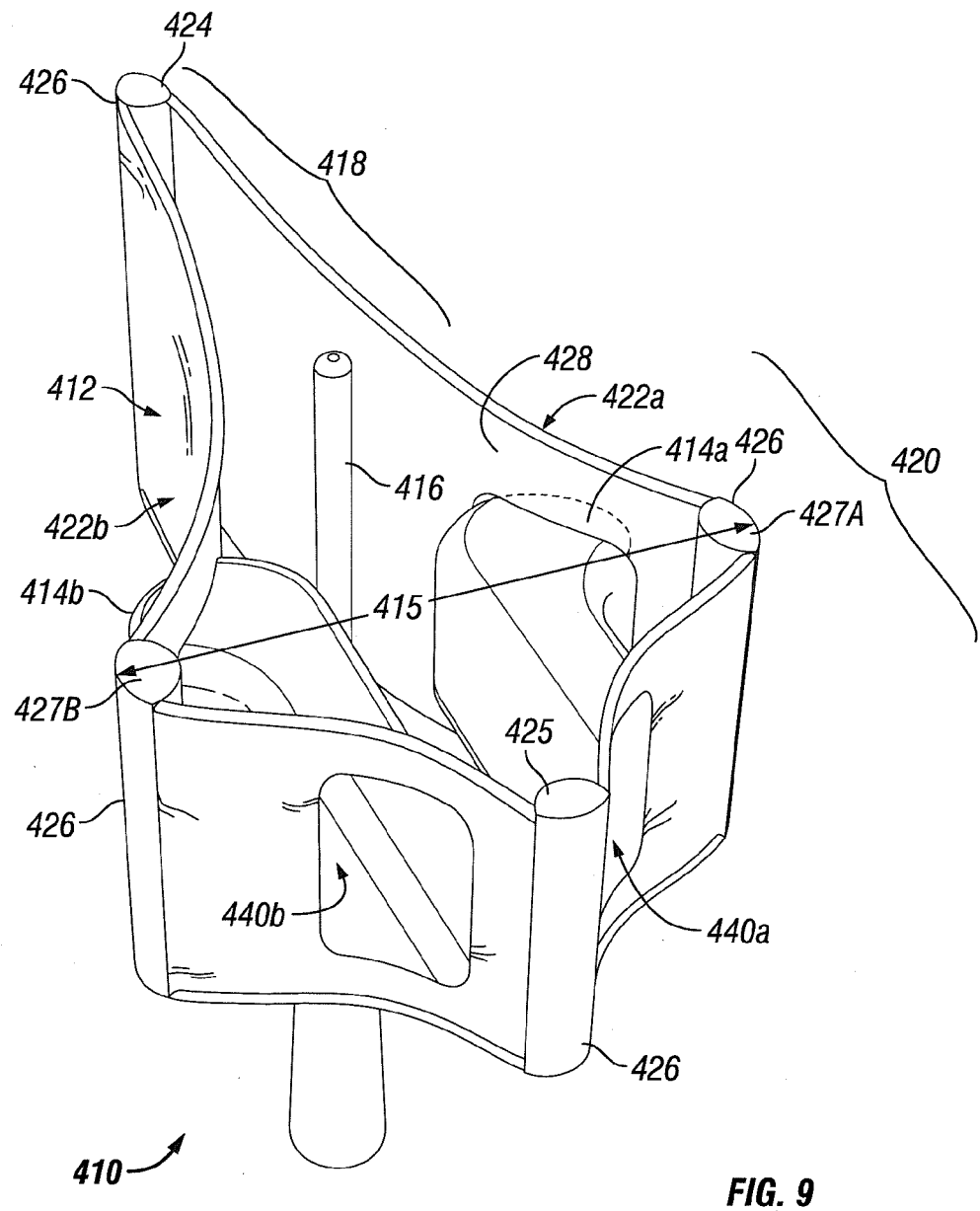
FIG. 9A is a side view of an embodiment of a wind energy system in accordance with the present invention.
FIG. 9B is a top view of an embodiment of a wind energy system in accordance with the present invention.
FIG. 9C is a front view of an embodiment of a wind energy system in accordance with the present invention.

Wind energy system 10, 210 is essentially a tower system which holds the main structure in place, which is set on a specialized foundation, including monopole 16, 216, 316, 916. The main structure of wind accelerator 12, 212 comprises support assembly 26, 226 and outer structure 28, 228, 328 surrounding, or mounted upon, the support assembly 12, 212. As shown in FIGS. 7 and 8, support assembly 212 utilizes either a system of steel/aluminum tubing members and or a mast and gantry type framework 230 of support members 231 which hold the system components in place. Any arrangement of tubes or wooden frame members may be used so long as sufficient support for outer structure 28, 228 and turbines 14, 214 is provided, and exemplary embodiments are shown, e.g., in FIGS. 7 and 8. Support assembly 226 defines a substantially hollow interior 232 formed by the components of the gantry framework 230 of support members 231.

The Exterior cover, or outer structure 28, of disclosed systems is either based on a Dacron or Mylar, or other types of Sail material or an aluminum or other hard but lightweight material. The material for the cover, or outer structure is chosen based on wind average annual wind speeds at a particular installation. In most installations, either a soft outer structure or hard outer structure could be used. For extremely high wind speeds, a hard outer structure may be required.

One or more wind turbines 14a, 14b are mounted in the rear region 20 of the wind accelerator. Any number of turbines could be utilized with the disclosed wind accelerator, and exemplary embodiments hold 2 to 4 turbines, which connect to a series of either vertical or horizontal mounted generators which range in size between 5 kW to 5 MW in size. Any type of horizontal axis wind turbine or vertical axis wind turbine could be used in connection with the disclosed wind energy systems, and exemplary embodiments employ vertical axis wind turbines ("VAWT") such as Darrieus or Savonius VAWT blade systems. Typically, a Darrieus blade system is appropriate for units generating power of about 10 kW or lower, and Savonius VAWT units are utilized for larger systems, especially those generating power of more than about 100 kW.

Figure 4:
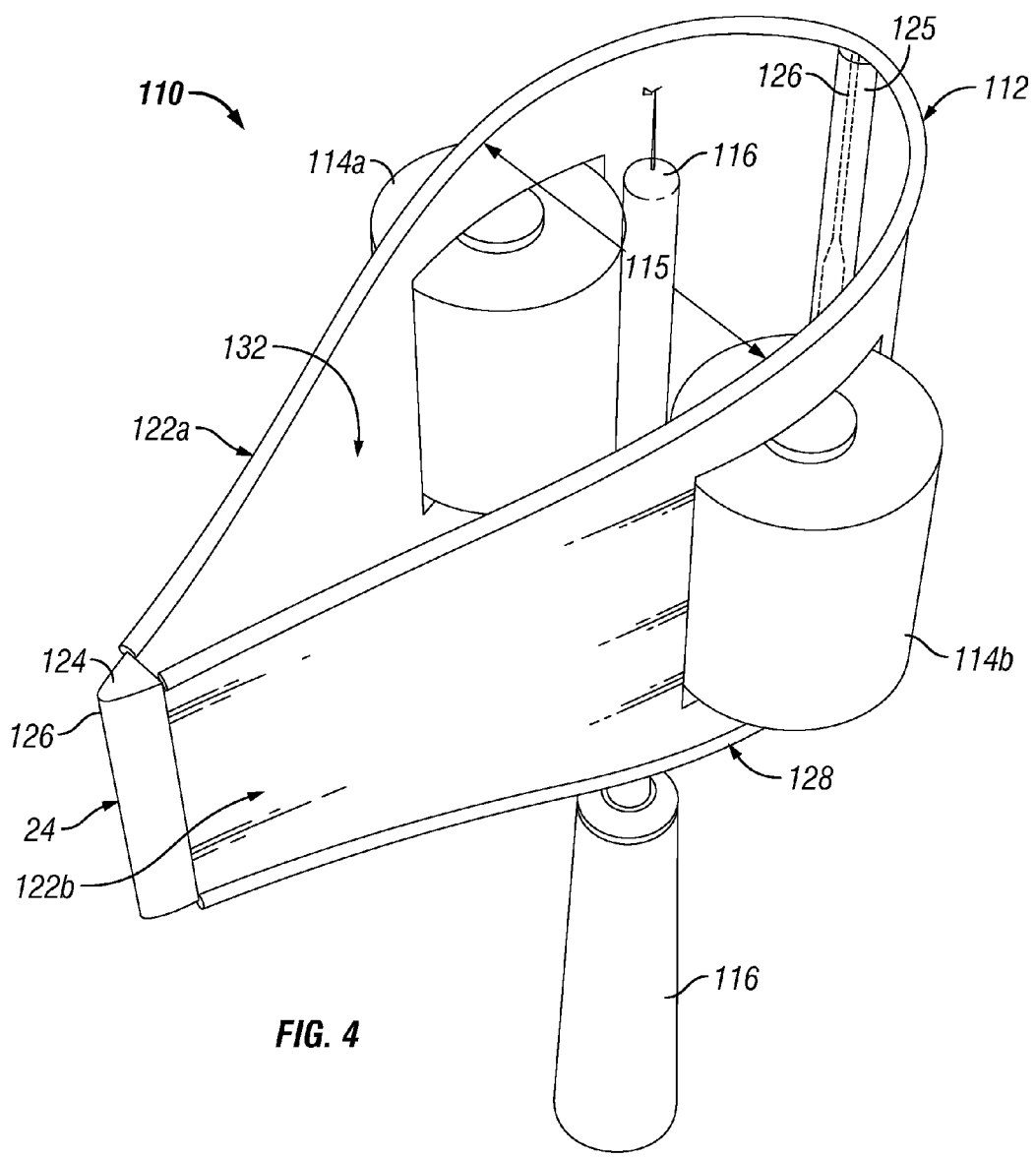
FIG. 4A is a side elevation view of an embodiment of a generator compartment in accordance with the present invention.
FIG. 4B is a plan view of an embodiment of a generator compartment in accordance with the present invention.

Turbines 14 may be mounted to the wind accelerator 12 at any points along the wind accelerator 12 and may be integrated with support assembly 26 as desired. In exemplary embodiments, wind turbines 14a, 14b are mounted on support assembly 26 in the rear region 20 of wind accelerator 12 via turbine shafts 38. The wind turbines 14a, 14b may be mounted such that a first portion 34 of the turbine 14 is disposed within the substantially hollow interior 32 of the support assembly 26 and a second portion 36 of the turbine 14 is located outside the outer structure 28 of the wind accelerator 12. Thus, about half of the turbine 14 is in the path of oncoming wind. As can be seen in FIGS. 3 and 4A-4B, support assembly 26 may include a turbine generator compartment 17 to house the generators 19. In exemplary embodiments, turbine generator compartment 17 comprises first and second parallel trusses 21, 23 and may be completely enclosed and waterproof to protect the generators 19 from damage due to inclement weather.

Figure 5:
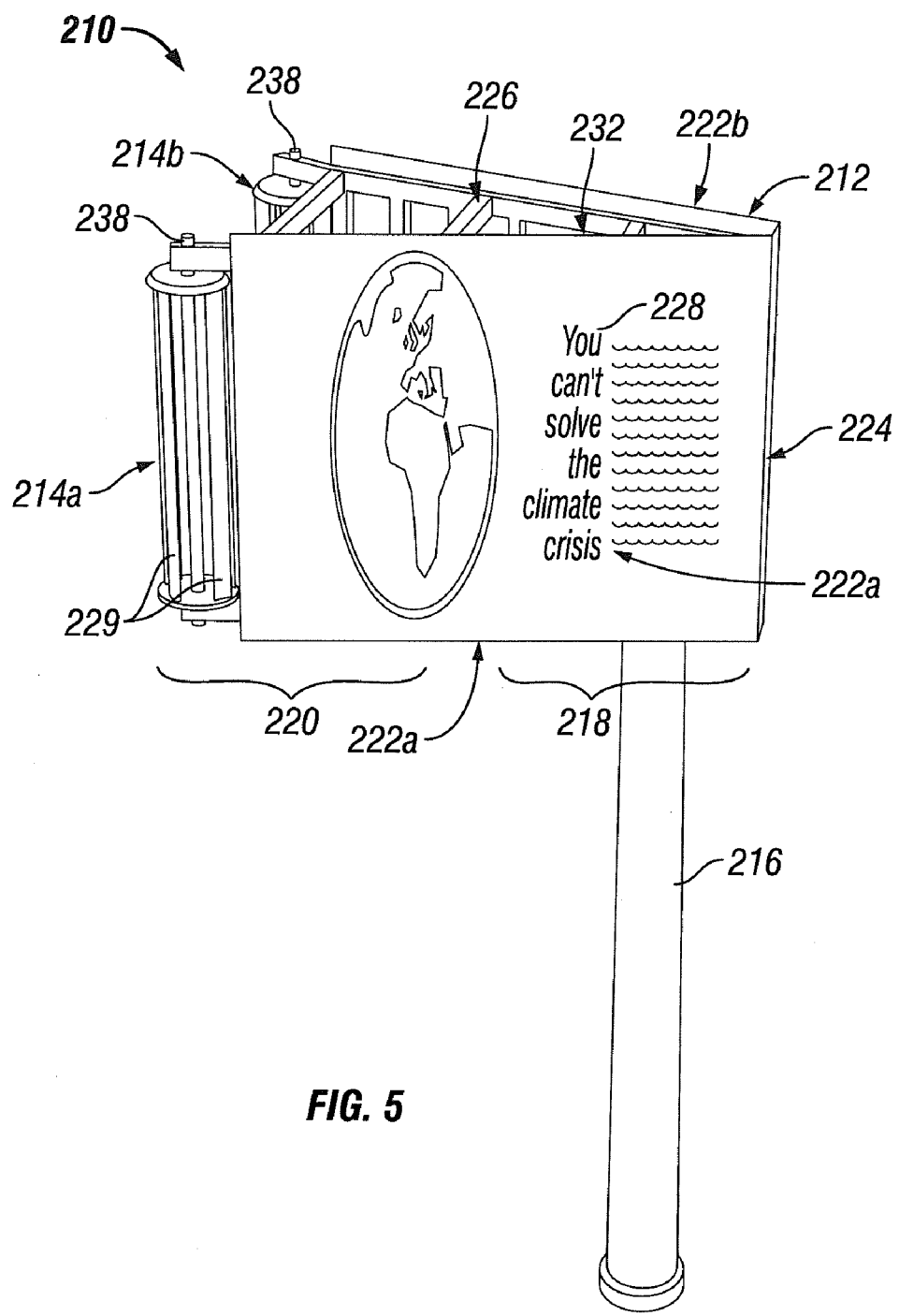
FIG. 5 is a side perspective view of an embodiment of a wind energy system in accordance with the present invention.
Figure 6:
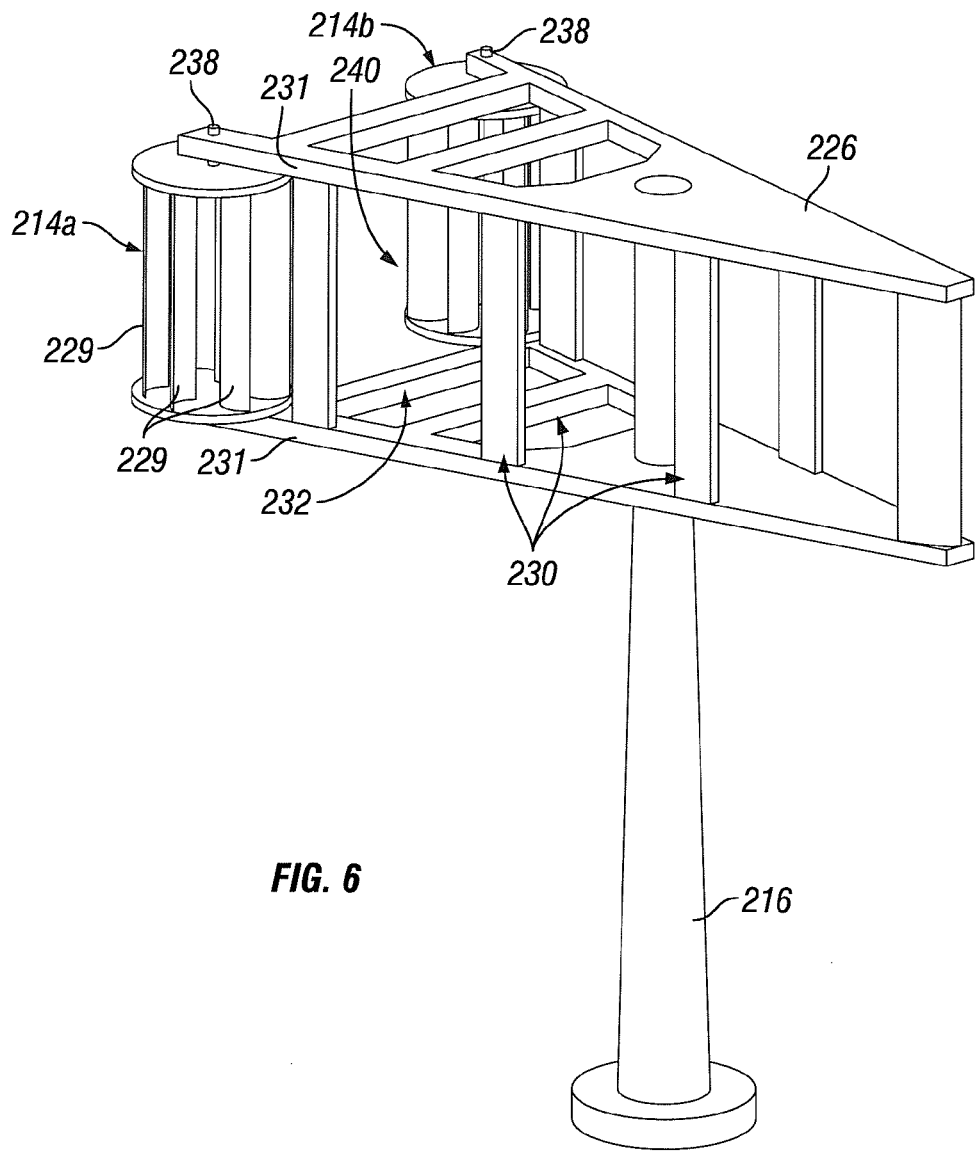
FIG. 6 is a perspective view of an embodiment of a wind energy system in accordance with the present invention.

Referring to FIGS. 5-6 exemplary embodiments of a main structure of a wind energy system 110 may be in a "tear drop or "tadpole" shape. Wind energy system 110 comprises the same or similar basic elements as the modified triangle embodiment shown in FIGS. 1-3. Specifically, wind energy system 110 comprises wind accelerator apparatus 112 having a front region 118 and a rear region 120, with the accelerator's widest point 115 being located in or near the rear region 120 of the wind accelerator apparatus 112. One or more turbines 114 mounted on the wind accelerator apparatus 112 at the rear region 120, and in exemplary embodiments, on each side 122a, 122b at the widest point 115 of the wind accelerator apparatus 112. This is because the widest point of the accelerator typically is the optimal point for wind acceleration and air velocity. Wind accelerator apparatus comprises a support assembly 126 and an outer structure 128 surrounding the support assembly 126.

Exemplary embodiments of a support assembly 126 may include a front point frame member 124 and a rear frame member 125. Outer structure 128 could be a flexible material such as sail cloth or a hard, lightweight material such as aluminum or wood. Rear region 120 is substantially wider than front region 118, and the outer structure 128 of the wind accelerator apparatus 112 tapers from the rear region 120 to the front region 118 and front point frame member 124. Wind turbines 114a, 114b are mounted on the wind accelerator apparatus 112 toward the rear region 120, for example, at the widest point 115, with one turbine 114a, 114b on each respective side 122a, 122b. In exemplary embodiments, the turbines 114a, 114b are mounted at or near the widest point 115 of the wind accelerator apparatus 112. Wind energy system 110 be include a monopole 116 for mounting the system at a desired height to receive wind. Wind energy system 110 may vary considerably in size, and exemplary embodiments are between about 12 feet long by 3 feet tall by 3 feet wide and 800 feet long by 200 feet tall by 200 feet wide.

Turning to FIGS. 7-9C, further embodiments of a wind energy system 210 will be described in which wind accelerator 212 is in a "V" shape. Again, the major components remain the same or similar as embodiments employing different shaped accelerators. Wind energy system 210 comprises wind accelerator 212 and wind turbines 214a, 214b mounted on the wind accelerator 212. Wind accelerator 212 comprises a front region 218 and a rear region 220 and tapers from the rear region 220 to the front region 218. In wedge-shaped embodiments, wind accelerator 212 and its support assembly 226 are configured such that the front region 218 includes the front point 224 of the wedge or triangle, and each side 222a, 222b of the wind accelerator forms a substantially straight side of the wedge or triangle. Thus, the rear region 220 of the wind accelerator 212 includes the two other points of the wedge or triangle forms the widest point 215 of the wind accelerator apparatus.

It can be seen that wind turbines 214a, 214b are mounted on the rear regions 220 of wind accelerator 212 at or near the widest point 215 of the wind accelerator. As discussed in more detail herein, this location of the turbines results in high speed air entering the turbine blades for optimal efficiency. As best seen in FIG. 8, support assembly 226 comprises a gantry framework 230 of vertical and horizontal frame members 231, which may be wood or any other material of suitable strength, and forms an air frame for air entering the accelerator's vents, as described below. The support assembly 226 defines a substantially hollow interior 232 within wind accelerator 212. The turbines may be any type of horizontal or vertical axis turbine, and in exemplary embodiments, are of the Savonius or Darrieus type. FIG. 7 shows an embodiment of wind energy system 210 employing a Darrieus type VAWT blade system, and FIG. 8 shows a Savonius VAWT being used. Each turbine 214a, 214b includes a vertical shaft 238 to allow the turbine blades 229 to rotate upon contact with wind, and each turbine is mounted to the support assembly 226 of wind accelerator 212 according to known VAWT mounting procedures. As shown, for example, in FIG. 8 the vertical shaft 238 of each turbine 214a, 214b is coupled to two of support assembly's 226 horizontal frame members 231 such that the turbines are mounted at the rear points of the wedge-shaped wind accelerator 212 and operational to receive airflow coming off the sides 222a, 222b of the wind accelerator 212.

Wind accelerator 212 further comprises an outer structure 228 that surrounds support assembly 226. The outer structure 228 may comprise a soft, flexible material such as sail cloth or substantially hard, but lightweight material such as aluminum, steel, wood, plastic or fiberglass. In exemplary embodiments, the outer structure 228 comprises two planks of a substantially hard material mounted upon each side of the support assembly 226 gantry framework 230, leaving the back of the wind accelerator open. Thus, outer structure 228 defines an open space or interior access area at the back of wind accelerator 212, and this open space may serve as a vent 240. Vent 240 allows air coming off of wind turbines 214a, 214b to flow through into the substantially hollow interior 232 of the wind accelerator 212. The air then exits through the open top and bottom formed by the support assembly 226 of the wind accelerator 212.

FIGS. 9A-9C show wedge-shaped embodiments in which the support assembly 326 of wind accelerator 312 comprises cut-off angled sections 342 to provide mounting locations for the wind turbines 314a, 314b. Each cut-off angled section 342a, 342b comprises a mounting member 344a, 344b for mounting wind turbine 314a, 314b via the turbines vertical shaft 338.

Figure 10:
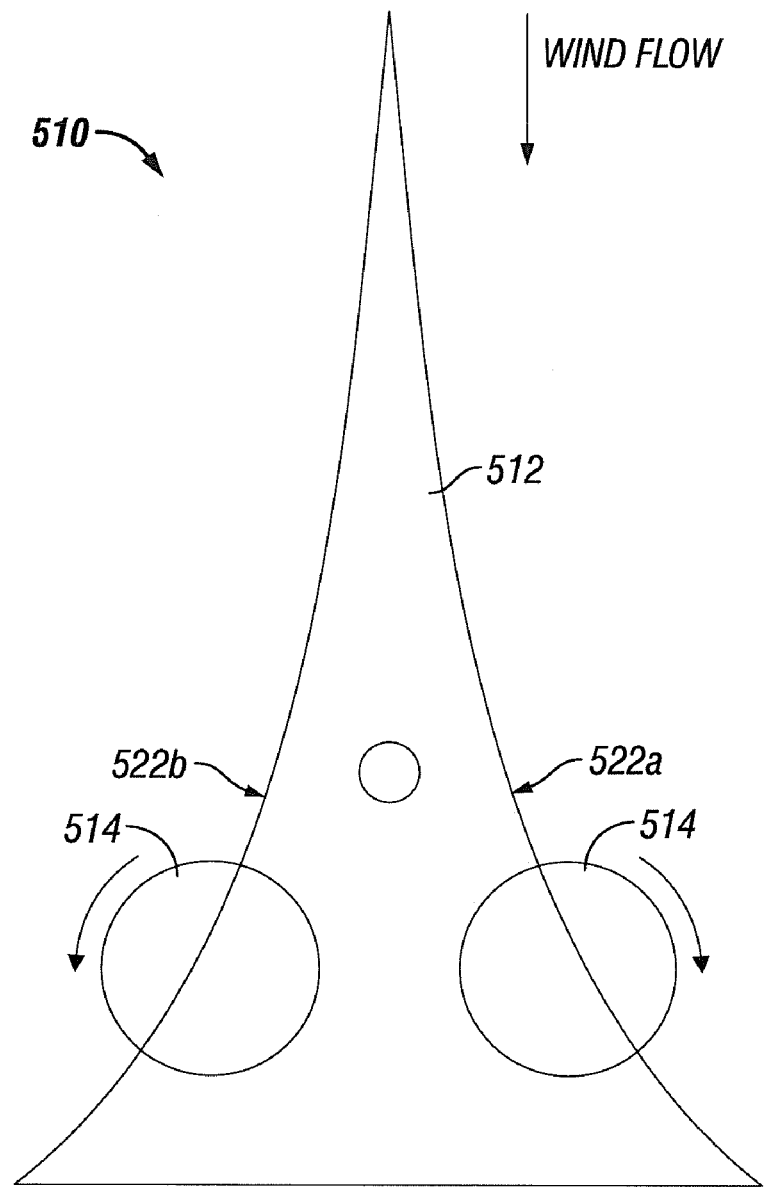
FIG. 10 is a side perspective view of an embodiment of a wind energy system in accordance with the present invention.
Figure 11C:
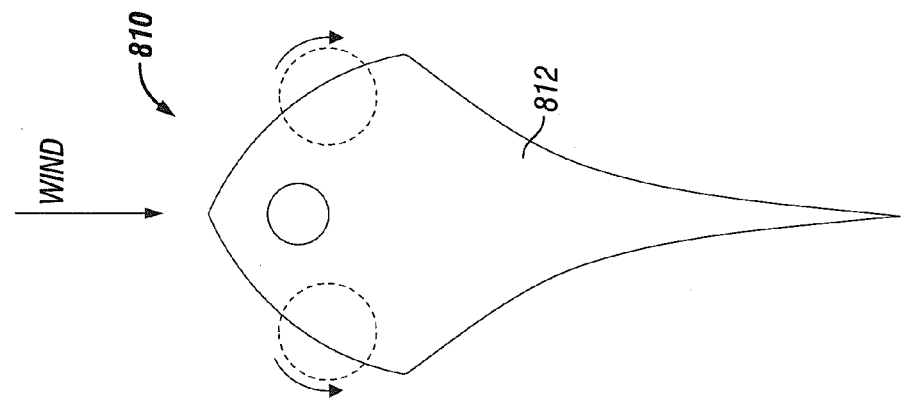
FIG. 11 is a perspective view of an embodiment of a wind energy system in accordance with the present invention.
Figure 11B:
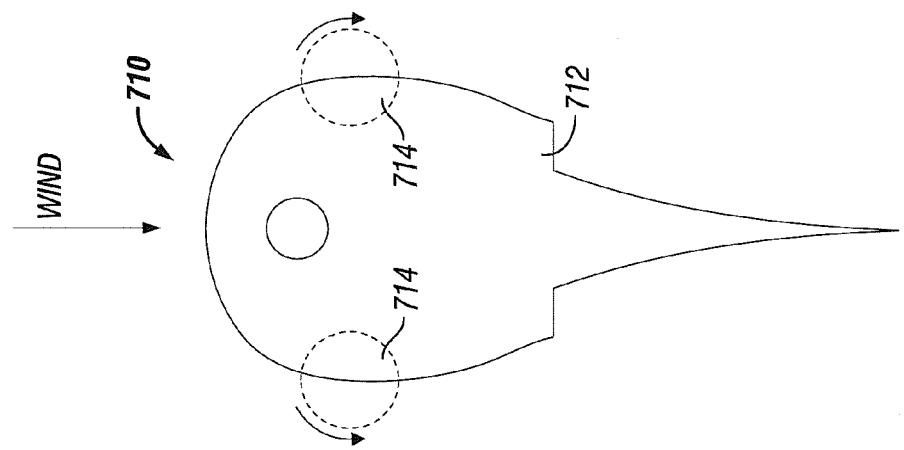
Figure 11A:
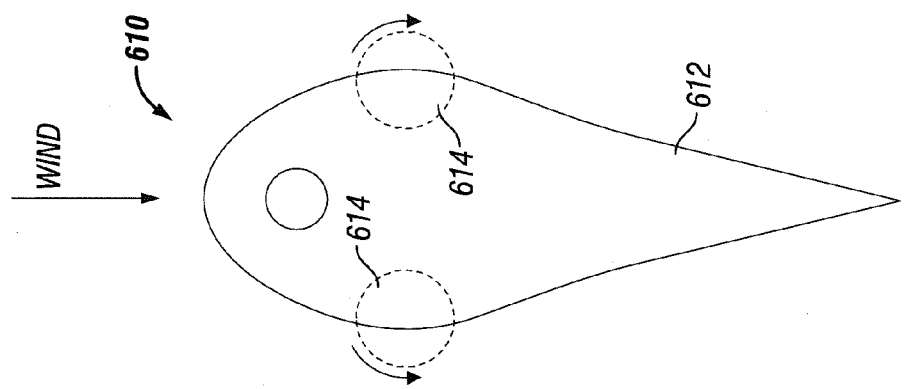

Exemplary embodiments of a wind energy system employing a modified tadpole or modified tear drop shape will now be described with reference to FIGS. 10 and 11. Wind energy apparatus 410 comprises one or more turbines 414 mounted on wind accelerator 412. The wind accelerator 412 has a rear region 420 and a front region 418, and the widest point 415 of wind accelerator 412 is toward the rear region 420. Wind accelerator 412 tapers from the accelerator's widest point 415, located in the rear region 420, to the front point 424 of the accelerator's front region 418. The wind accelerator 412 may be mounted on a tower or pole 416 and include a support assembly 426 and an outer structure 428 surrounding the support assembly 426. In exemplary embodiments, support assembly 426 comprises a front point frame member 424, a rear frame member 425 and two side frame members 427a, 427b.

Outer structure 428 is mounted on support assembly 426 and may be either a soft, flexible material such as sail cloth, which may comprise materials such as Mylar, Dacron, or cotton or other sail material membrane, or a substantially hard material such as aluminum steel, wood, or plastic. An outer structure 428 made of sail cloth or other flexible material may be a single loop of material and may be mounted on support assembly 426 by being draped around the support assembly 426 and tightly drawn against front point frame member 424, side frame members 427a, 427b and rear frame member 425. Alternatively, an outer structure made of hard or soft material may comprise several pieces, with a first piece coupled to and extending between front point frame member 424 and side frame member 427a, a second piece coupled to and extending between side frame member 427a and rear frame member 425, a third piece coupled to and extending between rear frame member 425 and side frame member 427b, and a fourth piece coupled to and extending between side frame member 427b and front point frame member 424.

Wind turbines 414a, 414b are mounted on the rear region 420 of wind accelerator 412 such that a first portion of each turbine 414 is disposed within the outer structure 428 of wind accelerator 412 and a second portion of each turbine 414 is located outside the outer structure 428 of wind accelerator 412 to receive oncoming wind. The portions of outer structure 428 that form the sides 422a, 422b of the wind accelerator 412 define turbine mounting apertures 442 sized to fit and allow mounting of turbines 414. As best seen in FIG. 11, the portions of outer structure 428 that form the back of the wind accelerator define vents 440a, 440b, each of which extends to a respective wind turbine 414a, 414b. This vent structure facilitates reverse flow of the air, which eddies off of the back of the wind accelerator 412 and gets carried through the vents 440a, 440b to the portions of the turbines 414a, 414b disposed inside the outer structure 428 of the wind accelerator 412. This extra air flow increases the volume of air that contacts the blades of the turbines and thus boosts the efficiency of the wind energy system 410.

Figure 13A:
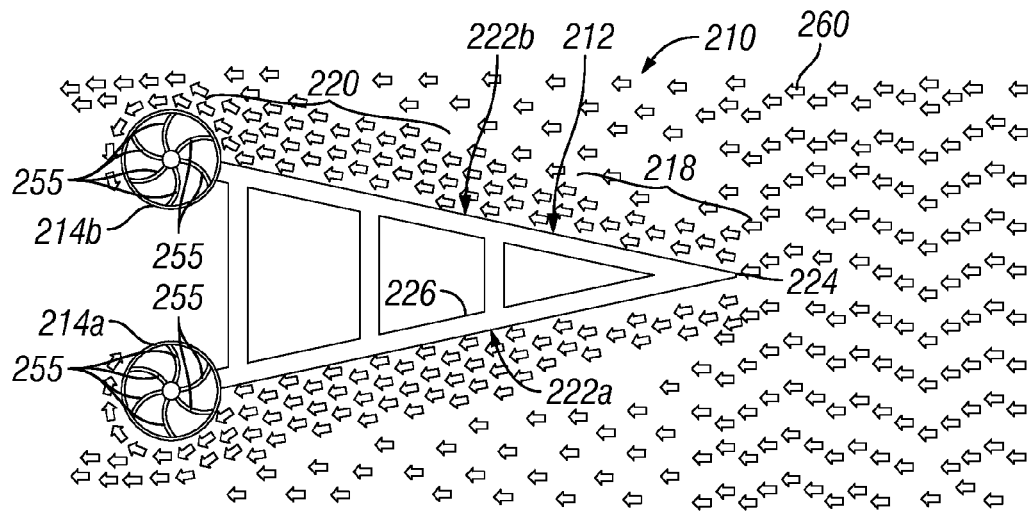
FIG. 13A is a plan view of an embodiment of a wind energy system in accordance with the present invention.
Figure 13B:
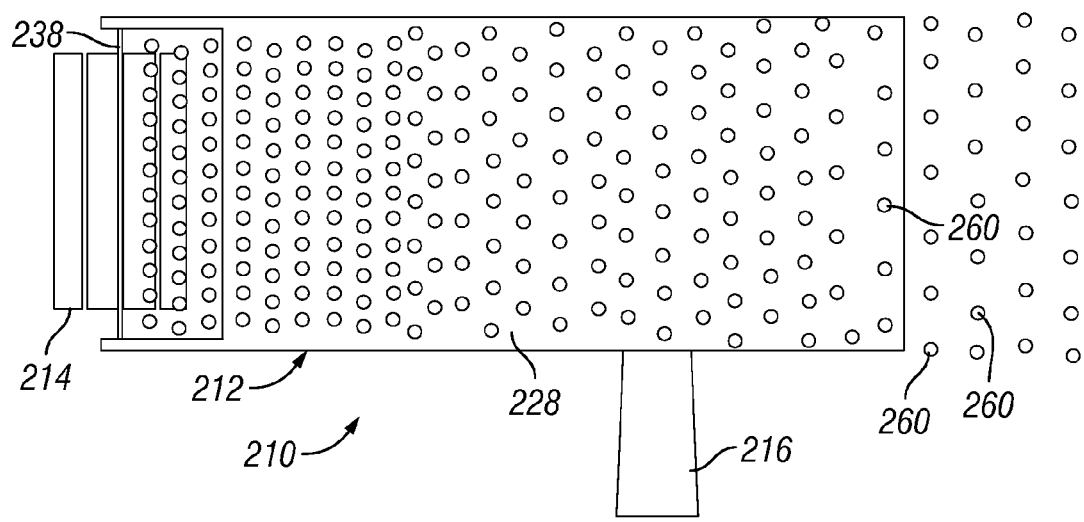
FIG. 13B is a plan view of an embodiment of a wind energy system in accordance with the present invention.

FIGS. 12 and 13A-13C depict additional embodiments of wind energy systems employing different possible shapes of the wind accelerator. It should be noted that all of these embodiments would have the same or similar components as the wind energy apparatus and systems described above. In FIG. 12 it can be seen that wind energy system 510 comprises two turbines 514 mounted on a wind accelerator 512 having a modified wedge shape, with the sides 522a, 522b forming a slightly curved shape rather than the straight lines of a triangle. FIG. 13A shows an embodiment of a wind energy system 610 that includes two turbines 614 mounted on a wind accelerator 612 having tear drop or tadpole shape. As shown in FIG. 13B, an embodiment of a wind energy system 710 includes two turbines 714 mounted on a wind accelerator 712 having a first modified tear drop or modified tadpole shape. FIG. 13C shows an embodiment of a wind energy system 810 wherein the wind accelerator 812 has a second modified tear drop or modified tadpole shape. It should be noted that the embodiments in FIGS. 13A-13C are designed so that the point of the wind accelerator that is the front point in previously described embodiments becomes the rear point and the turbines receive wind from the opposite end of the wind accelerator. Thus, the "front point" of the accelerator may be defined as the point of the accelerator that the air contacts first, and the "front region" may be any portion of the accelerator that the air flows past before it contacts the blades of the wind turbines.

Figure 14:
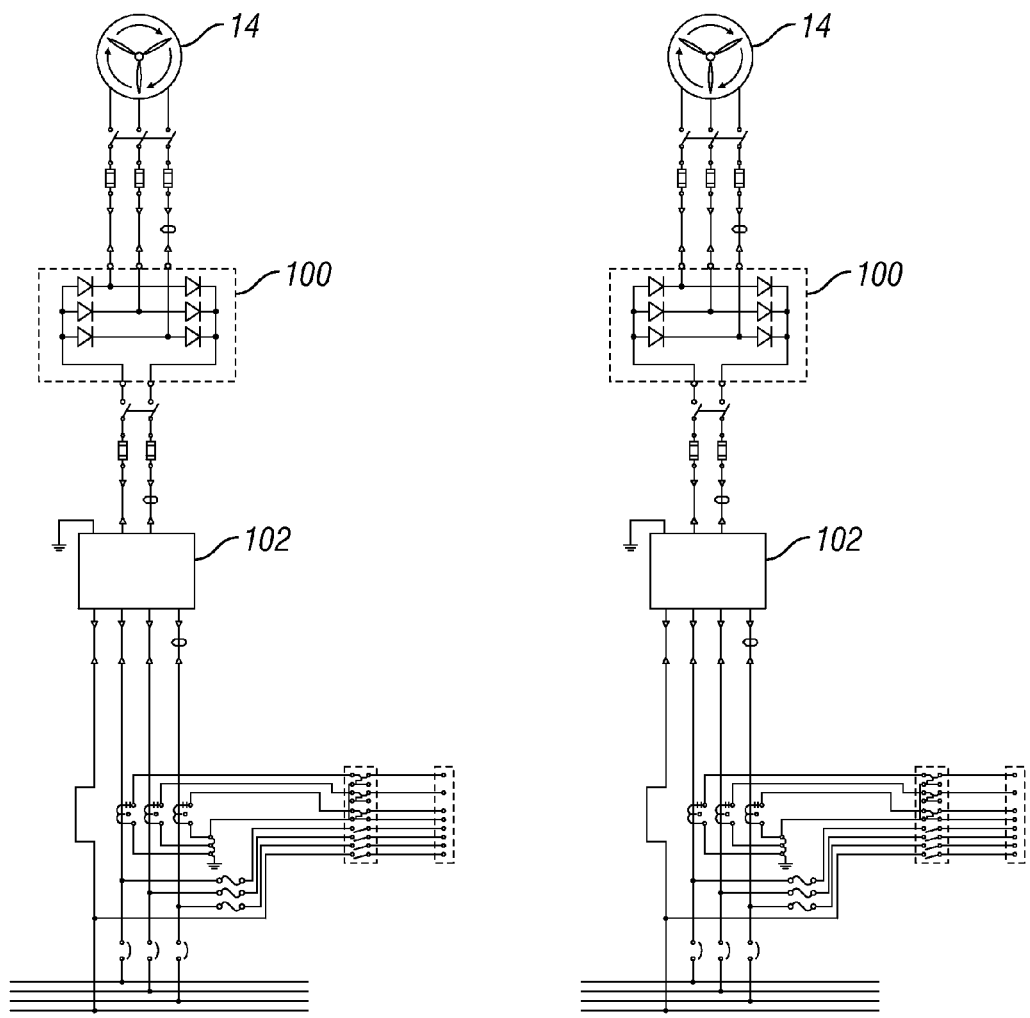
FIG. 14A is a side view of an embodiment of a wind energy system in accordance with the present invention.
FIG. 14B is a top view of an embodiment of a wind energy system in accordance with the present invention.
FIG. 14C is a front view of an embodiment of a wind energy system in accordance with the present invention.

Turning to FIGS. 14A-14C, embodiments of a wind energy system 910 may comprise a plurality of wind turbines 914 and additional peripheral accelerator components 950, such that the system forms a W-shape. Wind energy system 910 comprises a plurality of wind turbines 914a, 914b, 914c and 914d mounted on a main wedge-shaped wind accelerator 912 and two smaller peripheral accelerator components 950a, 950b. Mounting members 944a, 944b are coupled to the back of main wind accelerator 912, and mounting members 944c, 944d are each coupled to a respective peripheral accelerator component 950a, 950b. Wind turbines 914a and 914b are mounted on mounting members 944a and 944b via each turbine's vertical shaft 938. Turbines 914c and 914d are mounted on mounting members 944c and 944d by the vertical shafts 938. The wind accelerator 912 comprises support assembly 926, which may include a gantry framework 930 of frame members 931, and an outer structure 928 surrounding the support assembly. The oncoming wind accelerates from front point 924 of the accelerator's front region 918 to the rear region 920 and contacts the blades of turbines 914a and 914b. Oncoming wind also accelerates as it hits peripheral accelerator components 950a, 950b and travels to contact the blades of wind turbines 914c and 914d.

In operation, wind energy system 10, 110, 210, 310, 410, 510, 610, 710, 810, 910 is pointed into oncoming wind. The wind energy system may include the use of a met tower which orients the systems with the help of a servo mechanism. The use of met towers is known in the art. A met, or meteorological tower, is designed to assess wind resources. Generally a met tower will have anemometers, wind direction vanes, temperature and pressure sensors, and other measurement devices attached to it at various levels above the ground. Disclosed systems also may utilize a Doppler technology that calculates the most optimal orientations for the wind energy system in regards to capturing the air flow.

Figure 15:
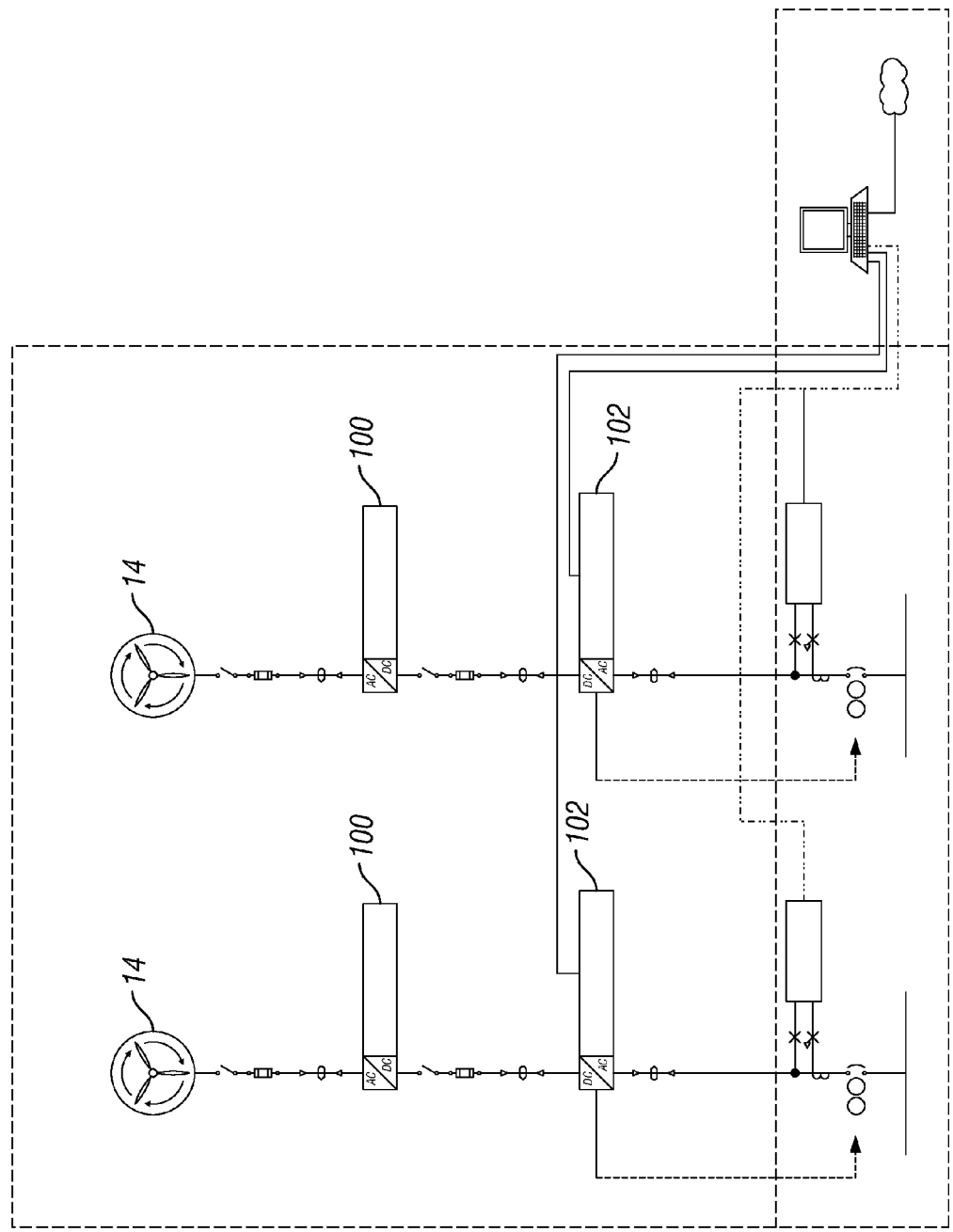
FIG. 15A is a top view of an embodiment of a wind energy system in accordance with the present invention showing air flow.
FIG. 15B is a side view of an embodiment of a wind energy system in accordance with the present invention showing air flow.

Referring to FIGS. 15A-15B and using wedge-shaped wind energy system 210 as an illustrative example, the system is oriented such that wind or air 260 flows straight into front point 224 of the wind accelerator 212. The air 260 flows across the wind accelerator 212 adjacent both sides 222a, 222b as it travels from the accelerator's front region 218 to its rear region 220. The air or wind speed increases between the point at which the air 260 hits the front point 224 of the accelerator and the point at which the air 260 contacts the blades 255 of the wind turbines 214. This air or wind speed increase or acceleration is depicted in FIGS. 15A-15B by the higher density of arrows and circles representing air 260 as the air 260 moves from the front region 218 to the rear region 220 of the accelerator 212. Thus, the air 260 is directed into the turbines 214 such that the air 260 contacting the turbines is moving at a higher velocity than the air flowing past the front point 224 and front region 218 of the wind accelerator 212. This is because the front points and angled shapes of all disclosed embodiments of wind accelerator eliminated drag and optimizes air flow through the wind turbines. In sum, the wind enters the structure's main field at a lower speed than when it comes into contact with the blade systems the increased air flow turns the blades faster than if the blades were open air free standing blades.

Figure 16:
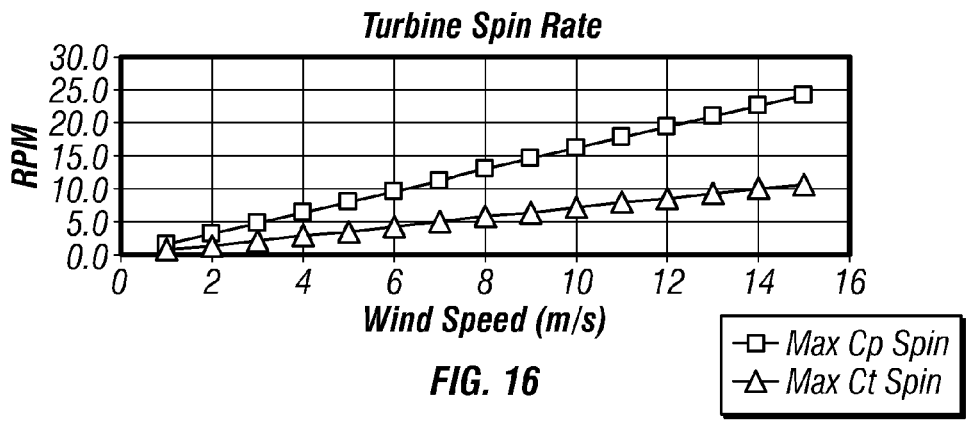
FIG. 16 is a schematic showing exemplary electrical connections of an embodiment of a wind energy system in accordance with the present invention.
Figure 17:
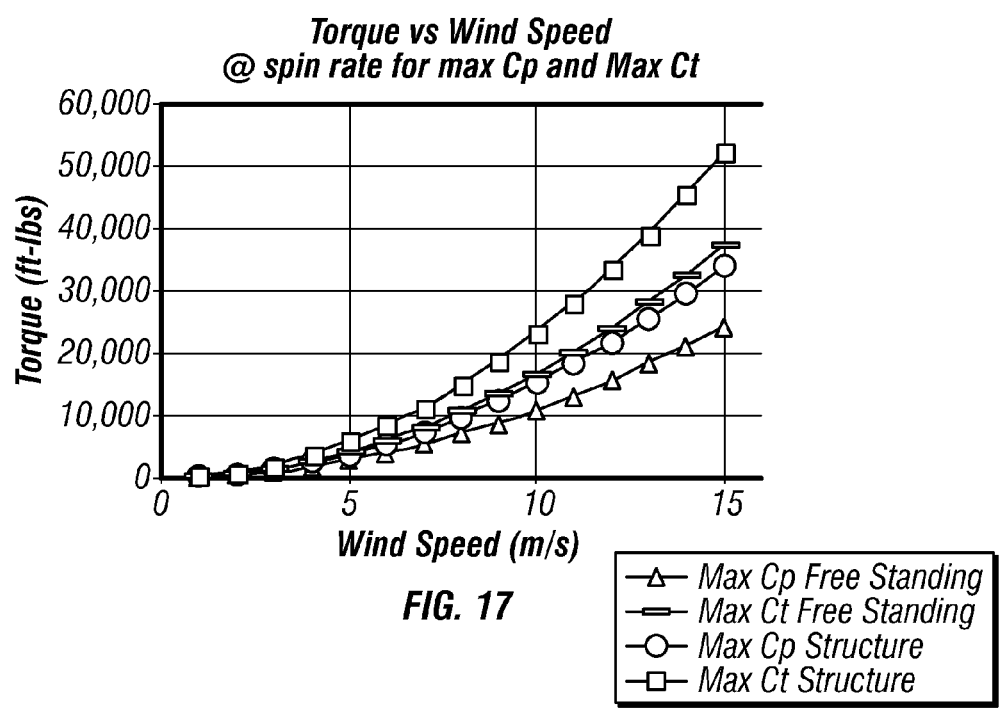
FIG. 17 is a schematic showing exemplary electrical connections of an embodiment of a wind energy system in accordance with the present invention.

As is known in the art, disclosed wind energy systems connect to an electricity rectifier 100, which cleans up the electric signal by converting the alternating current (AC) output of the turbine to direct current (DC). Rectifiers are known in the art and may be made of solid state diodes, vacuum tube diodes, mercury arc valves, and other components. The system also may utilize a power conditioning inverter 102 which changes DC current to an AC electric current. The use of inverters is well known in the art. FIGS. 16 and 17 are circuit diagrams that show exemplary arrangements of a wind energy system in operable electrical connection with a rectifier and inverter. These components allow disclosed wind energy Systems to offer a clean electric signal to the installation being powered. Utility Transformers, Utility Meters, Utility Circuit Breakers, Site Distribution tools, Wind Power meters, Wind Power Circuit breakers and Main Structure circuit breakers can also be used depending on the system needs.

EXAMPLE

Figure 18:
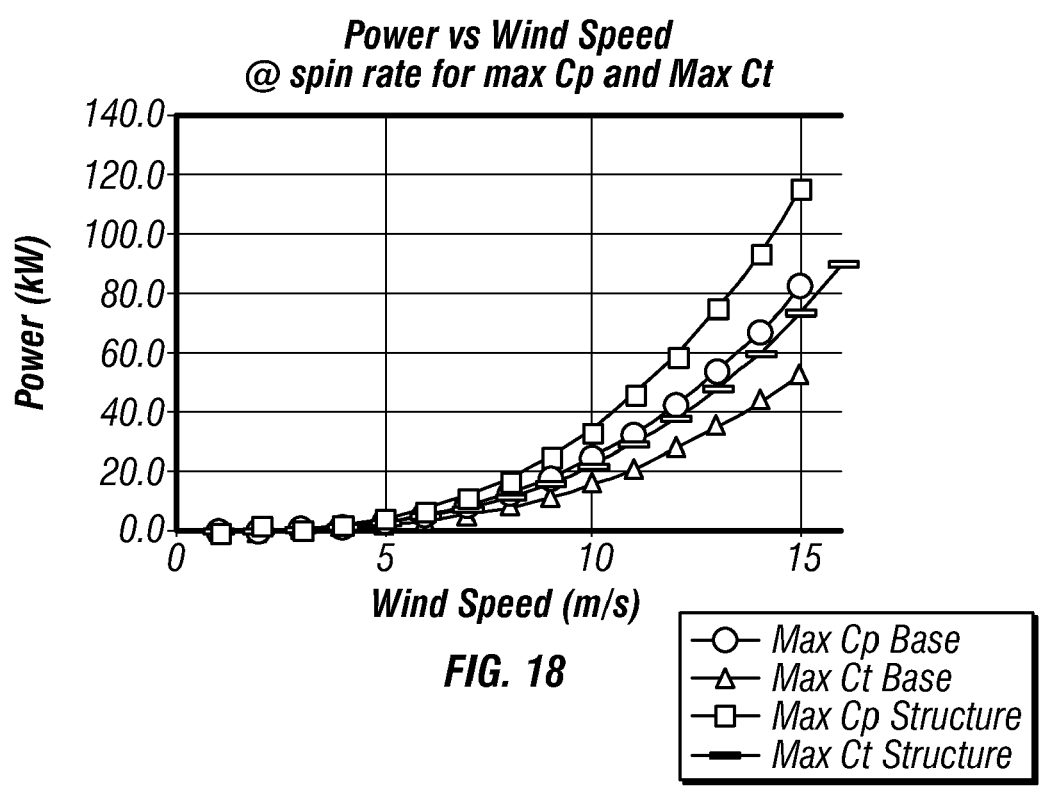
FIG. 18 shows the turbine spin rate as the wind speed increases.
Figure 19:
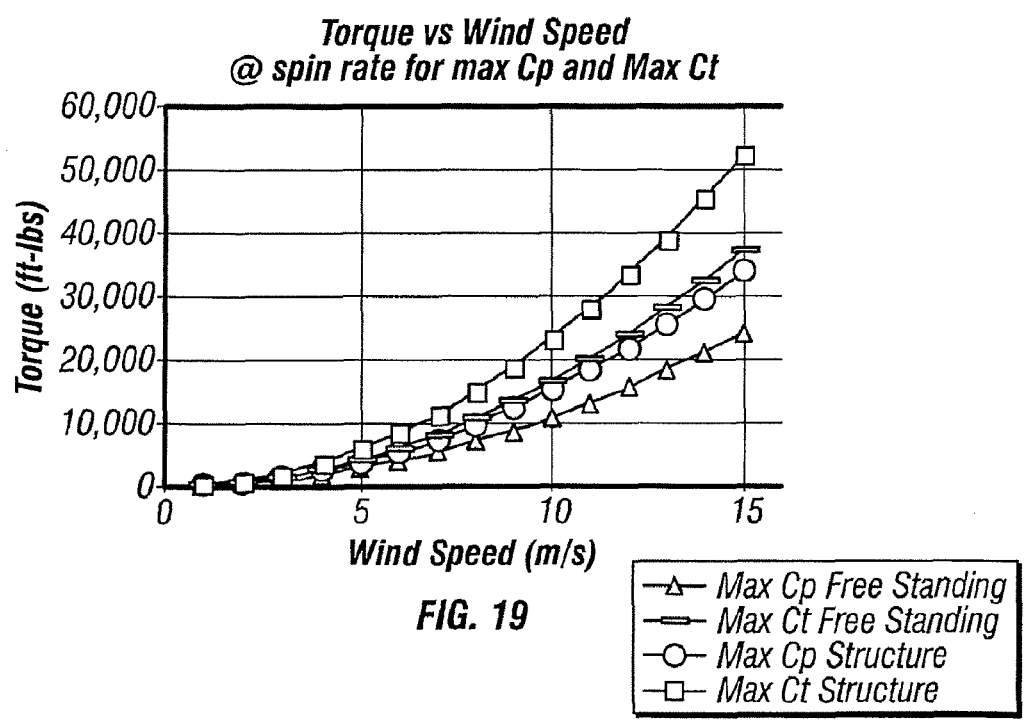
FIG. 19 shows the improved torque using a wedge-shaped embodiment of a disclosed wind accelerator.
Figure 20:
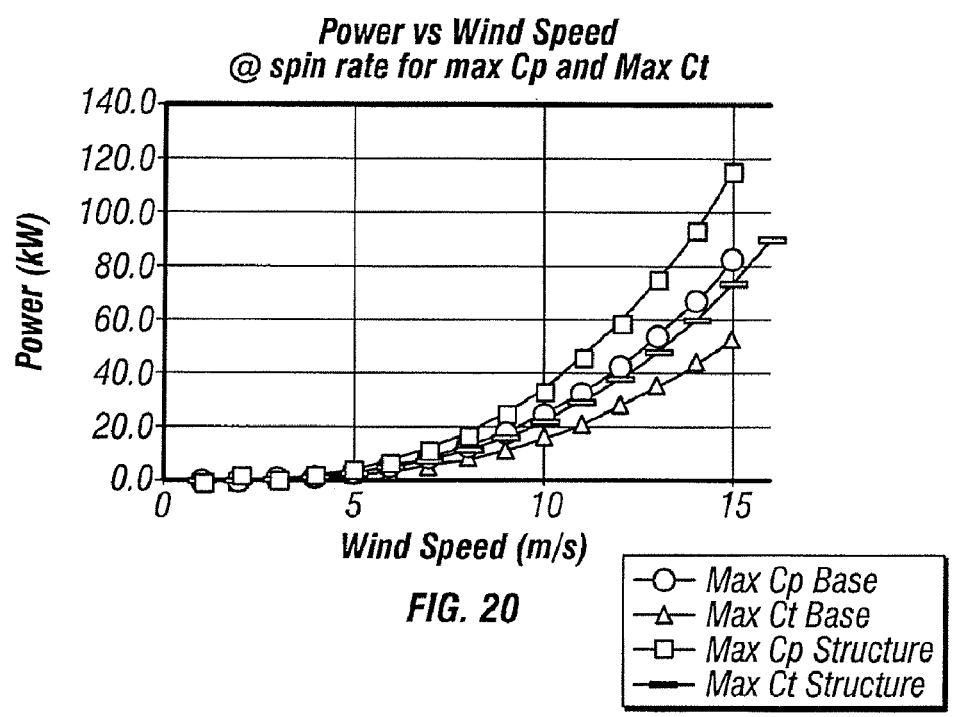
FIG. 20 shows the improved power using a wedge-shaped embodiment of a disclosed wind accelerator.

Disclosed wind energy systems and wind accelerators advantageously increase the air or wind speed by between about 10% and 50% as the air travels along the sides of the accelerator. Example 1 below shows the results of laboratory tests for turbine spin rate, torque vs wind speed and power vs wind speed data. The tests were performed in a computational fluid dynamics (CFD) laboratory. In particular, the tests used a CFD aerodynamics program called Fluent, which is known to provide more accurate results than wind tunnel testing. However, it should be noted that airflow is variable in a real world environment. The tests compared a computer-generated model of a disclosed prototype wind energy system embodiment having a wedge-shaped wind accelerator and Savonius turbines with a computer-generated model base system having a Savonius turbine mounted on a pole with no associated wind accelerator. TABLE 2A and FIG. 18 show the turbine spin rate as the wind speed increases. TABLE 3A and FIG. 19 show the improved torque using a wedge-shaped embodiment of a disclosed wind accelerator, and TABLE 4A and FIG. 20 show the improved power using a wedge-shaped embodiment of a disclosed wind accelerator.

Example 1

Data for Wedge-Shaped Accelerator

TABLE 1

Turbine Characteristics

Configuration

| | | |
|---|---|---|
| buckets | 2 | |
| stages | 2 | |

| | (ft) | (m) |
|---|---|---|
| Rotor radius | 17.5 | 5.34 |
| Rotor Height | 48 | 14.63 |
| Swept Area | 1680 | 156.16 |
| Runaway Tip Speed | X | 1.80 |

Performance Coefficients

| | Symbol | base | structure |
|---|---|---|---|
| Max Cp Operation | | | |
| Tip speed ratio | X | 0.90 | 0.90 |
| Power Coefficient | Cp | 0.25 | 0.35 |
| Torque Coefficient | Ct | 0.28 | 0.39 |
| Max Ct Operation | | | |
| Tip speed ratio | X | 0.40 | 0.40 |
| Power Coefficient | Cp | 0.16 | 0.22 |
| Torque Coefficient | Ct | 0.43 | 0.60 |
| Other Inputs | | | |
| air density | | 1.25 | kg/m^3 |

TABLE 2A

Turbine Spin Rate (Data)

| Lab Data Torque lb. ft. | Wind Speed m/s | Lab Data kWs | Turbine RPMs |
|---|---|---|---|
| 0 | 0.0 | 0.0 | |
| 134 | 1.0 | 0.00 | 1.70 |
| 536 | 2.0 | 0.20 | 3.40 |
| 1,205 | Cut In 3.0 | 0.60 | 5.10 |
| 2,143 | 4.0 | 1.30 | 6.80 |
| | 4.2 | | |
| | 4.4 | | |
| | 4.6 | | |
| | 4.8 | | |
| 3,348 | 5.0 | 4.00 | 8.50 |
| | 5.1 | | |
| | 5.4 | | |
| | 5.7 | | |
| 4,821 | 6.0 | 7.00 | 10.30 |
| | 6.3 | | |
| | 6.6 | | |
| | 6.9 | | |
| 6,562 | 7.0 | 11.00 | 12.00 |
| | 7.4 | | |
| | 7.8 | | |
| 8,571 | 8.0 | 16.50 | 13.70 |
| | 8.3 | | |
| | 8.7 | | |
| 10,847 | 9.0 | 23.50 | 15.40 |
| | 9.3 | | |
| | 9.7 | | |

TABLE 2A-continued

Turbine Spin Rate (Data)

| Lab Data Torque lb. ft. | Wind Speed m/s | Lab Data kWs | Turbine RPMs |
|---|---|---|---|
| 13,392 | 10.0 | 32.30 | 17.10 |
| | 10.3 | | |
| | 10.7 | | |
| 16,204 | 11.0 | 42.90 | 18.80 |
| | 11.2 | | |
| | 11.5 | | |
| | 11.8 | | |
| 19,284 | 12.0 | 55.70 | 20.50 |
| | 12.2 | | |
| | 12.5 | | |
| | 12.8 | | |
| 22,632 | 13.0 | 70.80 | 22.20 |
| | 13.5 | | |
| 26,248 | 14.0 | 88.40 | 23.90 |
| | 14.5 | | |
| 30,132 | 15.0 | 108.70 | 25.60 |
| | 15.5 | | |
| 34,283 | 16.0 | 131.90 | 27.30 |
| | 16.5 | | |
| 38,702 | 17.0 | 158.20 | 29.00 |
| | 17.5 | | |
| 43,390 | 18.0 | 187.80 | 30.80 |
| | 18.5 | | |
| 48,345 | 19.0 | 220.90 | 32.50 |

TABLE 3A

Torque Versus Wind Speed (Data)

| Wind Speed (m/s) | Wind Speed (knots) | spin (rad/s) | Tip Speed ratio | spin (RPM) | Power (kW) | Torque (n-m) | Torque (ft-lbs) |
|---|---|---|---|---|---|---|---|
| | | | Max Torque Spin Rate | | | | |
| TORQUE DATA (BASE 2 BUCKET, 2 STAGE SAVONIUS TURBINE) | | | | | | | |
| 0 | | | | | | | |
| 1 | 1.9 | 0.1 | 0.4 | 0.7 | 0.0 | 224 | 165 |
| 2 | 3.9 | 0.1 | 0.4 | 1.4 | 0.1 | 896 | 661 |
| 3 | 5.8 | 0.2 | 0.4 | 2.1 | 0.4 | 2,015 | 1,487 |
| 4 | 7.8 | 0.3 | 0.4 | 2.9 | 1.0 | 3,583 | 2,644 |
| 5 | 9.7 | 0.4 | 0.4 | 3.6 | 2.0 | 5,598 | 4,131 |
| 6 | 11.7 | 0.4 | 0.4 | 4.3 | 3.4 | 8,061 | 5,949 |
| 7 | 13.6 | 0.5 | 0.4 | 5.0 | 5.4 | 10,972 | 8,097 |
| 8 | 15.6 | 0.6 | 0.4 | 5.7 | 8.0 | 14,330 | 10,576 |
| 9 | 17.5 | 0.7 | 0.4 | 6.4 | 11.4 | 18,137 | 13,385 |
| 10 | 19.5 | 0.7 | 0.4 | 7.2 | 15.6 | 22,391 | 16,525 |
| 11 | 21.4 | 0.8 | 0.4 | 7.9 | 20.8 | 27,093 | 19,995 |
| 12 | 23.3 | 0.9 | 0.4 | 8.6 | 27.0 | 32,243 | 23,795 |
| 13 | 25.3 | 1.0 | 0.4 | 9.3 | 34.3 | 37,841 | 27,927 |
| 14 | 27.2 | 1.0 | 0.4 | 10.0 | 42.8 | 43,886 | 32,388 |
| 15 | 29.2 | 1.1 | 0.4 | 10.7 | 52.7 | 50,380 | 37,180 |
| 16 | 31.1 | 1.2 | 0.4 | 11.5 | 64.0 | 57,321 | 42,303 |
| 17 | 33.1 | 1.3 | 0.4 | 12.2 | 76.7 | 64,710 | 47,756 |
| 18 | 35.0 | 1.3 | 0.4 | 12.9 | 91.1 | 72,547 | 53,540 |
| 19 | 37.0 | 1.4 | 0.4 | 13.6 | 107.1 | 80,832 | 59,654 |
| 20 | 38.9 | 1.5 | 0.4 | 14.3 | 124.9 | 89,564 | 66,098 |
| TORQUE DATA (OPTIMIZED SYSTEM WITH STRUCTURE SINGLE 2 BUCKET, 2 STAGE SAVONIUS TURBINE) | | | | | | | |
| 0 | | | | | | | |
| 1 | 1.9 | 0.1 | 0.4 | 0.7 | 0.0 | 313 | 231 |
| 2 | 3.9 | 0.1 | 0.4 | 1.4 | 0.2 | 1,254 | 925 |
| 3 | 5.8 | 0.2 | 0.4 | 2.1 | 0.6 | 2,821 | 2,082 |
| 4 | 7.8 | 0.3 | 0.4 | 2.9 | 1.4 | 5,016 | 3,702 |
| 5 | 9.7 | 0.4 | 0.4 | 3.6 | 2.7 | 7,837 | 5,784 |
| 6 | 11.7 | 0.4 | 0.4 | 4.3 | 4.7 | 11,285 | 8,328 |
| 7 | 13.6 | 0.5 | 0.4 | 5.0 | 7.5 | 15,360 | 11,336 |
| 8 | 15.6 | 0.6 | 0.4 | 5.7 | 11.2 | 20,062 | 14,806 |
| 9 | 17.5 | 0.7 | 0.4 | 6.4 | 15.9 | 25,391 | 18,739 |
| 10 | 19.5 | 0.7 | 0.4 | 7.2 | 21.9 | 31,347 | 23,134 |

TABLE 3A-continued

Torque Versus Wind Speed (Data)

| Wind Speed (m/s) | Wind Speed (knots) | Max Torque spin (rad/s) | Tip Speed ratio | Spin Rate (RPM) | Power (kW) | Torque (n-m) | Torque (ft-lbs) |
|---|---|---|---|---|---|---|---|
| 11 | 21.4 | 0.8 | 0.4 | 7.9 | 29.1 | 37,930 | 27,993 |
| 12 | 23.3 | 0.9 | 0.4 | 8.6 | 37.8 | 45,140 | 33,314 |
| 13 | 25.3 | 1.0 | 0.4 | 9.3 | 48.0 | 52,977 | 39,097 |
| 14 | 27.2 | 1.0 | 0.4 | 10.0 | 60.0 | 61,441 | 45,343 |
| 15 | 29.2 | 1.1 | 0.4 | 10.7 | 73.8 | 70,532 | 52,052 |
| 16 | 31.1 | 1.2 | 0.4 | 11.5 | 89.5 | 80,249 | 59,224 |
| 17 | 33.1 | 1.3 | 0.4 | 12.2 | 107.4 | 90,594 | 66,858 |
| 18 | 35.0 | 1.3 | 0.4 | 12.9 | 127.5 | 101,566 | 74,956 |
| 19 | 37.0 | 1.4 | 0.4 | 13.6 | 150.0 | 113,164 | 83,515 |
| 20 | 38.9 | 1.5 | 0.4 | 14.3 | 174.9 | 125,390 | 92,538 |

TABLE 4A

Power Versus Wind Speed (Data)

| Wind Speed (m/s) | Wind Speed (knots) | Max Power spin (rad/s) | spin (RPM) | Tip Speed ratio | Power (kW) | Torque (n-m) | Torque (ft-lbs) |
|---|---|---|---|---|---|---|---|
| POWER DATA (BASE 2 BUCKET, 2 STAGE SAVONIUS TURBINE) | | | | | | | |
| 0 | | | | | | | |
| 1 | 1.9 | 0.2 | 1.6 | 0.9 | 0.0 | 146 | 108 |
| 2 | 3.9 | 0.3 | 3.2 | 0.9 | 0.2 | 583 | 430 |
| 3 | 5.8 | 0.5 | 4.8 | 0.9 | 0.7 | 1,312 | 968 |
| 4 | 7.8 | 0.7 | 6.4 | 0.9 | 1.6 | 2,333 | 1,722 |
| 5 | 9.7 | 0.8 | 8.1 | 0.9 | 3.0 | 3,645 | 2,690 |
| 6 | 11.7 | 1.0 | 9.7 | 0.9 | 5.3 | 5,249 | 3,874 |
| 7 | 13.6 | 1.2 | 11.3 | 0.9 | 8.4 | 7,144 | 5,272 |
| 8 | 15.6 | 1.3 | 12.9 | 0.9 | 12.5 | 9,331 | 6,887 |
| 9 | 17.5 | 1.5 | 14.5 | 0.9 | 17.8 | 11,810 | 8,716 |
| 10 | 19.5 | 1.7 | 16.1 | 0.9 | 24.4 | 14,580 | 10,760 |
| 11 | 21.4 | 1.9 | 17.7 | 0.9 | 32.5 | 17,642 | 13,020 |
| 12 | 23.3 | 2.0 | 19.3 | 0.9 | 42.2 | 20,996 | 15,495 |
| 13 | 25.3 | 2.2 | 20.9 | 0.9 | 53.6 | 24,641 | 18,185 |
| 14 | 27.2 | 2.4 | 22.6 | 0.9 | 67.0 | 28,577 | 21,090 |
| 15 | 29.2 | 2.5 | 24.2 | 0.9 | 82.3 | 32,805 | 24,210 |
| 16 | 31.1 | 2.7 | 25.8 | 0.9 | 99.9 | 37,325 | 27,546 |
| 17 | 33.1 | 2.9 | 27.4 | 0.9 | 119.9 | 42,137 | 31,097 |
| 18 | 35.0 | 3.0 | 29.0 | 0.9 | 142.3 | 47,240 | 34,863 |
| 19 | 37.0 | 3.2 | 30.6 | 0.9 | 167.4 | 52,635 | 38,844 |
| 20 | 38.9 | 3.4 | 32.2 | 0.9 | 195.2 | 58,321 | 43,041 |
| POWER DATA (OPTIMIZED SYSTEM WITH STRUCTURE SINGLE 2 BUCKET, 2 STAGE SAVONIUS TURBINE) | | | | | | | |
| 0 | | | | | | | |
| 1 | 1.9 | 0.2 | 1.6 | 0.9 | 0.0 | 204 | 151 |
| 2 | 3.9 | 0.3 | 3.2 | 0.9 | 0.3 | 816 | 603 |
| 3 | 5.8 | 0.5 | 4.8 | 0.9 | 0.9 | 1,837 | 1,356 |
| 4 | 7.8 | 0.7 | 6.4 | 0.9 | 2.2 | 3,266 | 2,410 |
| 5 | 9.7 | 0.8 | 8.1 | 0.9 | 4.3 | 5,103 | 3,766 |
| 6 | 11.7 | 1.0 | 9.7 | 0.9 | 7.4 | 7,348 | 5,423 |
| 7 | 13.6 | 1.2 | 11.3 | 0.9 | 11.7 | 10,002 | 7,381 |
| 8 | 15.6 | 1.3 | 12.9 | 0.9 | 17.5 | 13,064 | 9,641 |
| 9 | 17.5 | 1.5 | 14.5 | 0.9 | 24.9 | 16,534 | 12,202 |
| 10 | 19.5 | 1.7 | 16.1 | 0.9 | 34.2 | 20,412 | 15,064 |
| 11 | 21.4 | 1.9 | 17.7 | 0.9 | 45.5 | 24,699 | 18,228 |
| 12 | 23.3 | 2.0 | 19.3 | 0.9 | 59.0 | 29,394 | 21,693 |
| 13 | 25.3 | 2.2 | 20.9 | 0.9 | 75.0 | 34,497 | 25,459 |
| 14 | 27.2 | 2.4 | 22.6 | 0.9 | 93.7 | 40,008 | 29,526 |
| 15 | 29.2 | 2.5 | 24.2 | 0.9 | 115.3 | 45,928 | 33,895 |
| 16 | 31.1 | 2.7 | 25.8 | 0.9 | 139.9 | 52,255 | 38,565 |
| 17 | 33.1 | 2.9 | 27.4 | 0.9 | 167.8 | 58,992 | 43,536 |
| 18 | 35.0 | 3.0 | 29.0 | 0.9 | 199.2 | 66,136 | 48,808 |
| 19 | 37.0 | 3.2 | 30.6 | 0.9 | 234.3 | 73,688 | 54,382 |
| 20 | 38.9 | 3.4 | 32.2 | 0.9 | 273.3 | 81,649 | 60,257 |

Thus, it is seen that wind energy systems and methods are provided. It should be understood that any of the foregoing configurations and specialized components or chemical compounds may be interchangeably used with any of the systems of the preceding embodiments. Although illustrative embodiments of the present invention are described hereinabove, it will be evident to one skilled in the art that various changes and modifications may be made therein without departing from the invention. It is intended in the appended claims to cover all such changes and modifications that fall within the true spirit and scope of the invention.

What is claimed is:

1. A wind energy system comprising:
    a wind accelerator having a front region and a rear region and defining an open top or an open bottom, the rear region being substantially wider than the front region, the wind accelerator tapering from the rear region to the front region, the rear region defining one or more vents facilitating reverse inflow of air and vertical outflow of air through the open top or the open bottom; and
    one or more turbines mounted on the rear region of the wind accelerator.

2. The system of claim 1 wherein when air flows across the wind accelerator the air accelerates as it travels from the front region to the rear region.

3. The system of claim 2 wherein the wind accelerator directs the air into the one or more turbines such that the air contacting the one or more turbines is moving at a higher velocity than air flowing past the front region of the wind accelerator.

4. The system of claim 3 wherein the wind accelerator comprises a support assembly and an outer structure surrounding the support assembly.

5. The system of claim 4 wherein the outer structure is made of a flexible material.

6. The system of claim 4 wherein the support assembly defines a substantially hollow interior.

7. The system of claim 4 wherein the outer structure defines one or more rear vents.

8. The system of claim 3 further comprising a rectifier and an inverter to provide electricity from the turbines.

9. The system of claim 1 wherein the wind accelerator is one of the following shapes: wedge, tear drop, tadpole, V-shape, W-shape, modified wedge, modified teardrop or modified tadpole.

10. The system of claim 1 further comprising means for orienting the wind energy system so that it faces into oncoming wind.

11. The system of claim 1 wherein the one or more turbines is selected from the group: Darrieus vertical axis wind turbine and Savonius vertical axis wind turbine.

12. A wind accelerator apparatus comprising:
    a support assembly and an outer structure surrounding the support assembly and defining an open top or an open bottom, the wind accelerator apparatus having a front region and a rear region, the rear region including a widest point of the wind accelerator apparatus and being substantially wider than the front region, the outer structure tapering from the rear region to the front region and defining an open back facilitating reverse inflow of air and vertical outflow of air through the open top or the open bottom.

13. The apparatus of claim 12 further comprising one or more turbines mounted on the support assembly at or near the widest point of the wind accelerator apparatus.

14. The apparatus of claim 13 wherein the wind accelerator apparatus directs the air into the one or more turbines such that the air contacting the one or more turbines is moving at a higher velocity than air flowing past the front region of the wind accelerator apparatus.

15. The apparatus of claim 13 wherein the outer structure is made of sail cloth.

16. The apparatus of claim 15 wherein the support assembly comprises a gantry framework defining a substantially hollow interior.

17. The wind accelerator apparatus of claim 12 wherein when air flows across the wind accelerator apparatus the air accelerates as it travels across the outer structure from the front region to the rear region.

18. A wind energy apparatus comprising:
a wind accelerator having:
 a support assembly and an outer structure surrounding the support assembly, the support assembly defining a substantially hollow interior, an open top or an open bottom, and an open back facilitating reverse airflow into the substantially hollow interior and vertical outflow of air through the open top or the open bottom; and
 a front region and a rear region, the rear region being substantially wider than the front region, the outer structure tapering from the rear region to the front region;
 one or more turbines mounted on the support assembly in the rear region of the wind accelerator.

19. The apparatus of claim 18 wherein when air flows across the wind accelerator the air accelerates as it travels across the outer structure from the front region to the rear region.

20. The apparatus of claim 18 wherein the wind accelerator is mounted on a pole and height of the apparatus is less than about 200 feet.

* * * * *